US011191222B2

(12) United States Patent
Cho et al.

(10) Patent No.: US 11,191,222 B2
(45) Date of Patent: Dec. 7, 2021

(54) PLANT FACTORY

(71) Applicants: Young Chai Cho, Gyeonggi-do (KR); Han Mok Cho, Seoul (KR)

(72) Inventors: Young Chai Cho, Gyeonggi-do (KR); Han Mok Cho, Seoul (KR)

( * ) Notice: Subject to any disclaimer, the term of this patent is extended or adjusted under 35 U.S.C. 154(b) by 106 days.

(21) Appl. No.: 16/640,478

(22) PCT Filed: Aug. 23, 2017

(86) PCT No.: PCT/KR2017/009226
§ 371 (c)(1),
(2) Date: Feb. 20, 2020

(87) PCT Pub. No.: WO2019/039625
PCT Pub. Date: Feb. 28, 2019

(65) Prior Publication Data
US 2020/0214228 A1    Jul. 9, 2020

(51) Int. Cl.
*A01G 9/18* (2006.01)
*A01G 9/24* (2006.01)
(Continued)

(52) U.S. Cl.
CPC .............. *A01G 9/18* (2013.01); *A01G 7/045* (2013.01); *A01G 9/1423* (2013.01); *A01G 9/24* (2013.01);
(Continued)

(58) Field of Classification Search
CPC .......... A01G 9/18; A01G 9/1423; A01G 9/24; A01G 9/247; A01G 9/246
See application file for complete search history.

(56) References Cited

U.S. PATENT DOCUMENTS 10,136,587 B1 *  11/2018  Johnson ................. A01G 9/023
2016/0014977 A1 *  1/2016  Esaki ...................... A01G 31/06
                                                                    47/66.6
(Continued)

FOREIGN PATENT DOCUMENTS

CN        102318523 A      1/2012
CN        203505180 U      4/2014
(Continued)

OTHER PUBLICATIONS

International Search Report dated May 11, 2018 in corresponding International Application No. PCT/KR2017/009226.

*Primary Examiner* — Monica L Barlow
(74) *Attorney, Agent, or Firm* — Medler Ferro Woodhouse & Mills PLLC

(57) ABSTRACT

The present invention relates to a plant factory, which provides the following effects. The mesh-shaped floor is formed through the layer division support frame in the cultivation chamber, and the floor is divided into the cultivation layers having a multi-layered structure of two or more layers, thereby minimizing input resources and maximizing space and energy utilization efficiencies. In addition, a horizontal airflow is generally formed in each of the cultivation layers divided by the cultivation chamber air circulation supply unit, and an interlayer circulation airflow is formed between the respective cultivation layers divided by the mesh-shaped floor through the interlayer air circulation unit, and the cultivation table air supply unit creates a planting layer vertical descending air flow divided inside the cultivation table, which evenly improves the airflow rate regardless of the place in the cultivation chamber, reducing the deviation in temperature and carbon dioxide ($CO_2$) concentration, and the net photosynthetic rate and plant may increase productivity by increasing the speed of growth.

16 Claims, 19 Drawing Sheets

(51) Int. Cl.
*A01G 7/04* (2006.01)
*A01G 9/14* (2006.01)
*A01G 9/26* (2006.01)

(52) U.S. Cl.
CPC ............ *A01G 9/247* (2013.01); *A01G 9/249* (2019.05); *A01G 9/26* (2013.01)

(56) References Cited

U.S. PATENT DOCUMENTS

2020/0236870 A1* 7/2020 Lys .................. A01G 7/045
2020/0352113 A1* 11/2020 Canipe .............. A01G 9/249

FOREIGN PATENT DOCUMENTS

| | | |
|---|---|---|
| JP | 2015-099674 A | 5/2015 |
| KR | 10-2011-0096618 A | 8/2011 |
| KR | 10-1053146 B1 | 8/2011 |
| KR | 10-2012-0021050 A | 3/2012 |
| KR | 10-1246782 B1 | 3/2013 |
| KR | 10-2015-0113457 A | 10/2015 |
| KR | 10-1655351 B1 | 9/2016 |

* cited by examiner

[FIG. 1]
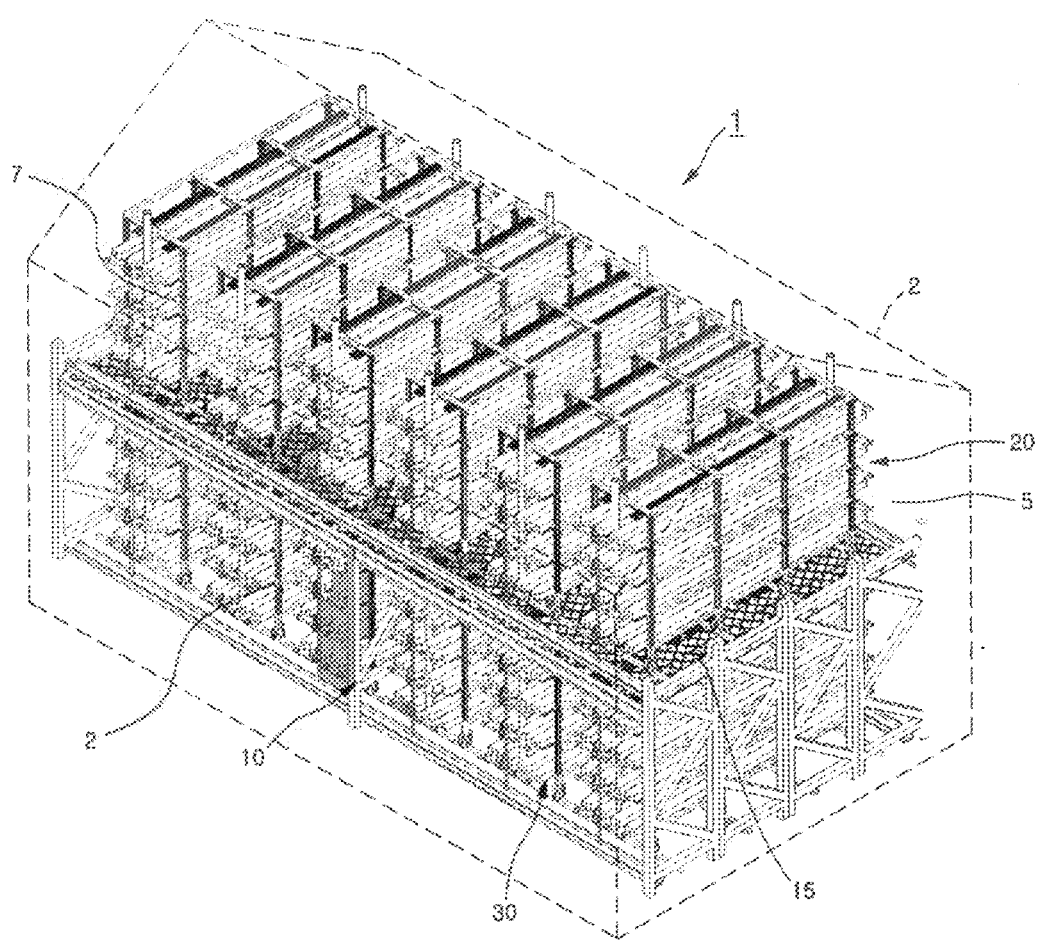

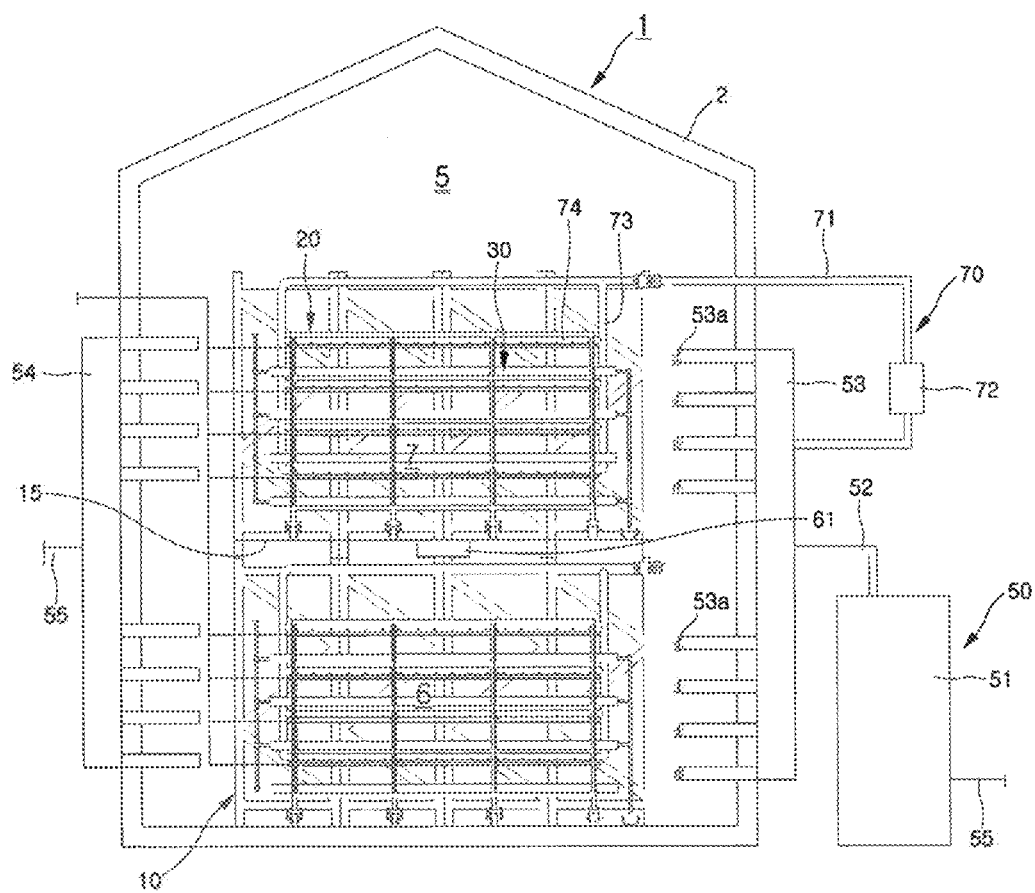
[FIG. 2]

[FIG. 3]
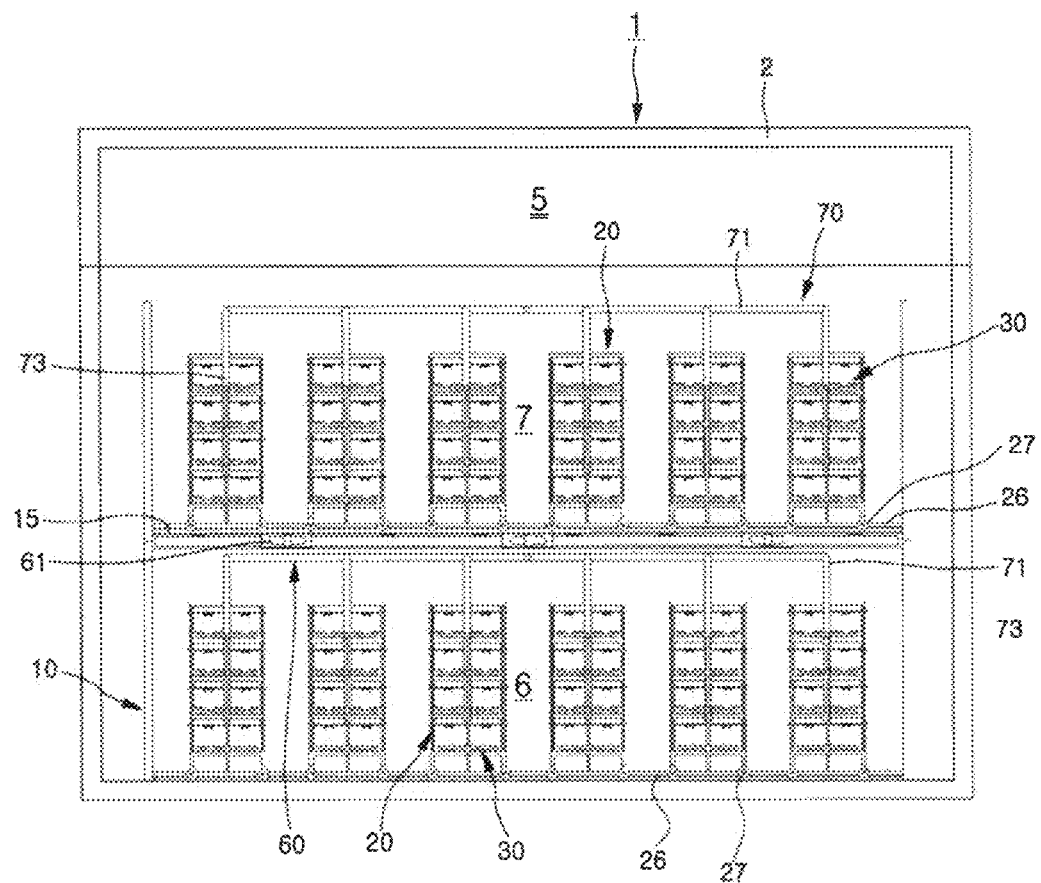

[FIG. 4]
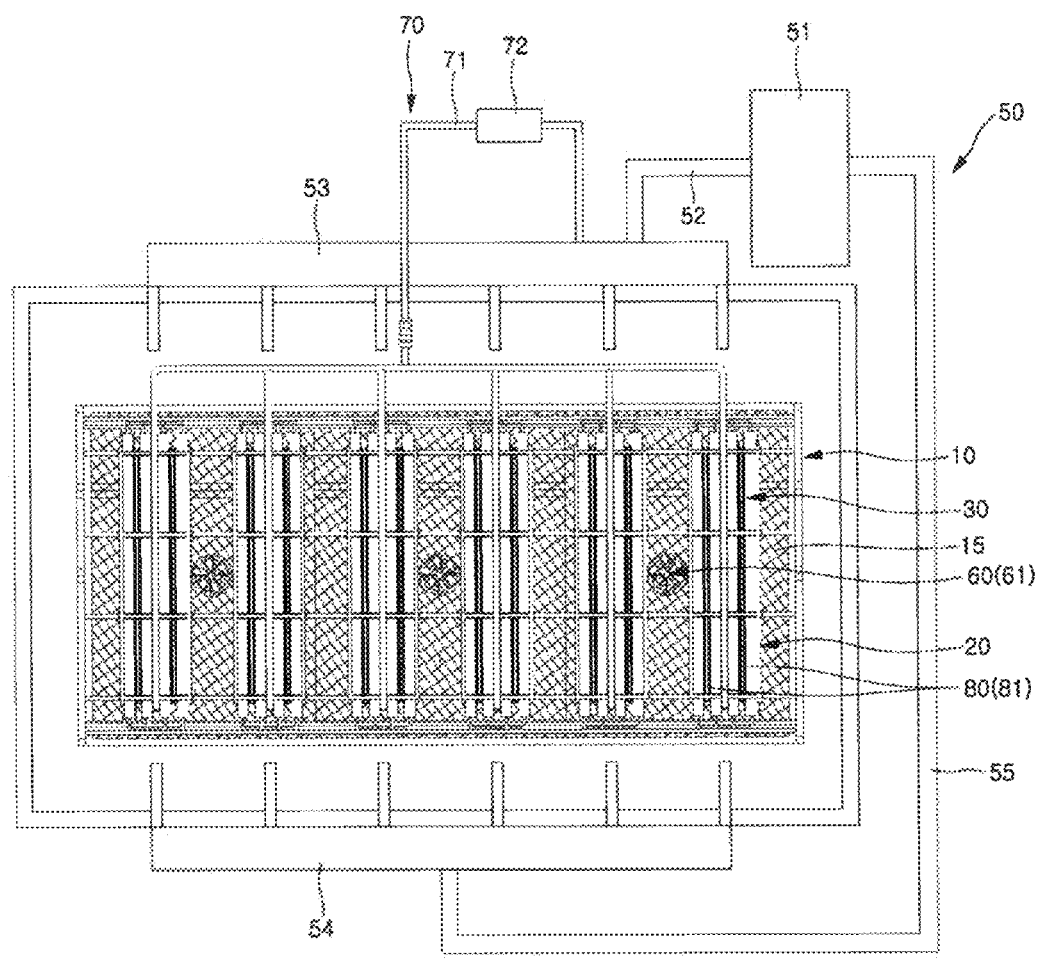

[FIG. 5]
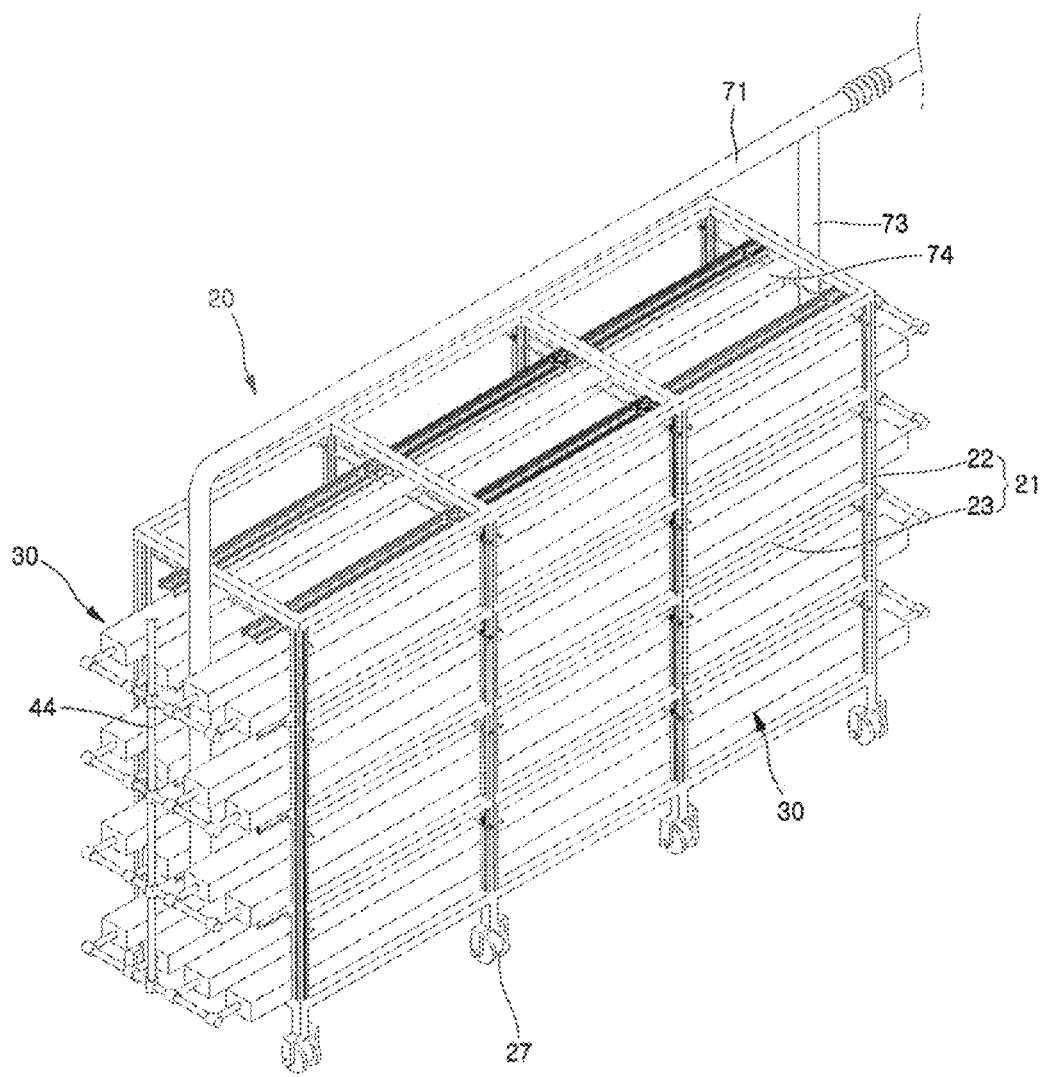

[FIG. 6]
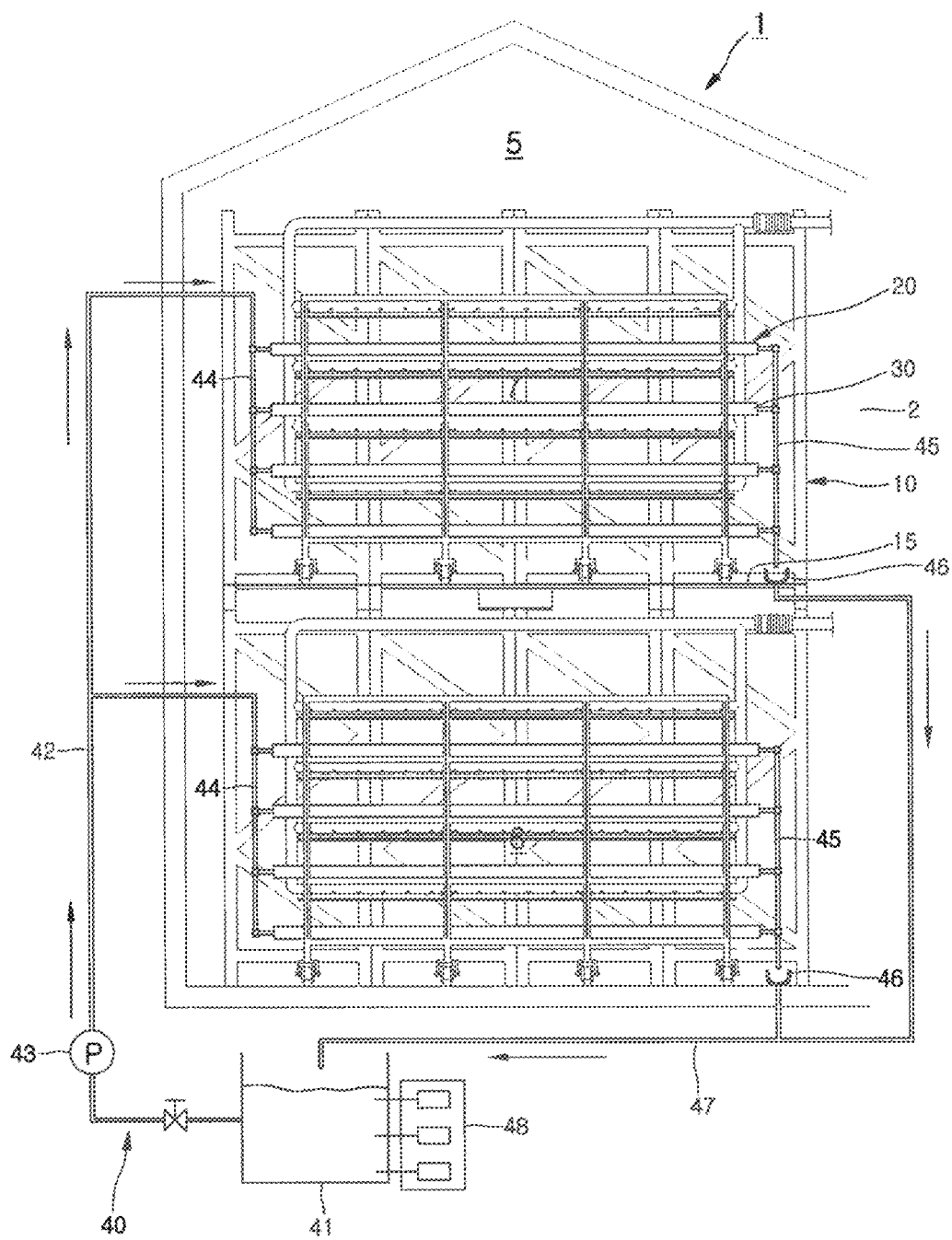

[FIG. 7]
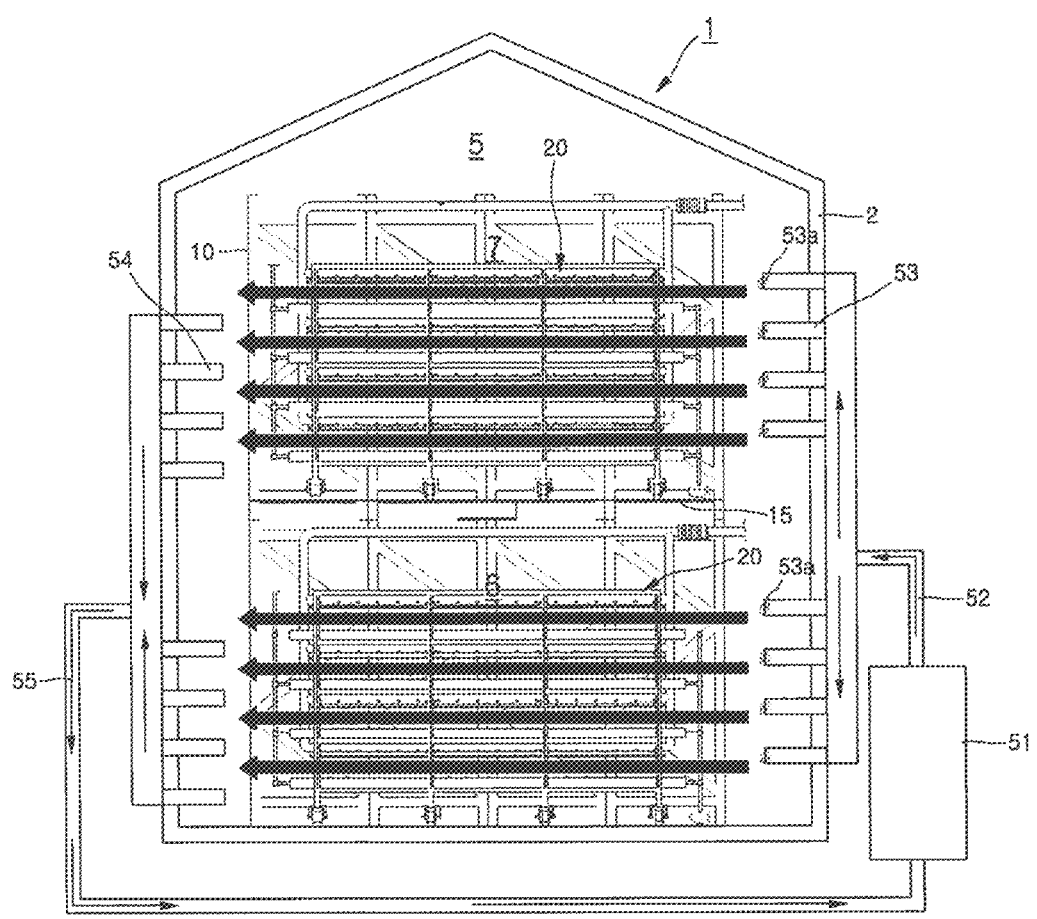

[FIG. 8]
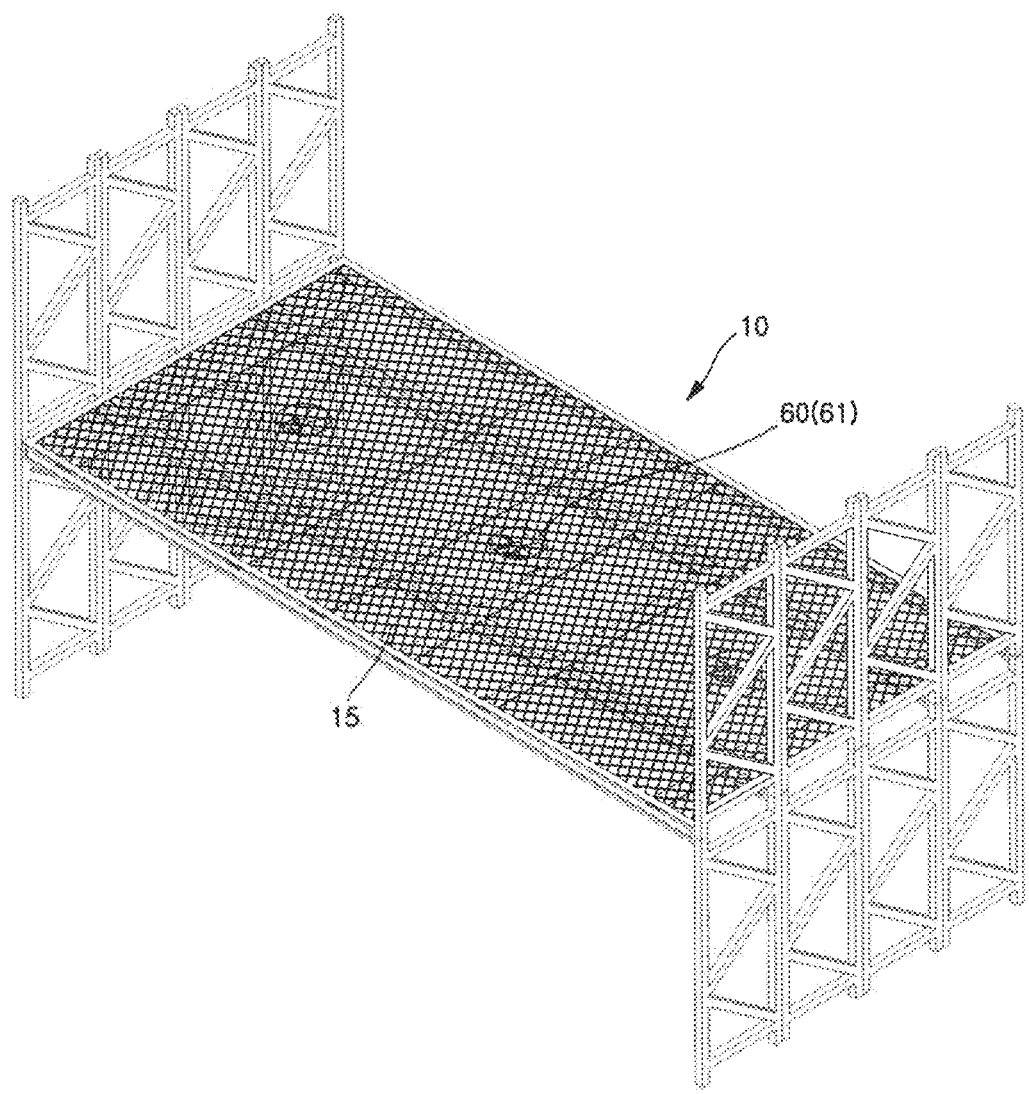

[FIG. 9]
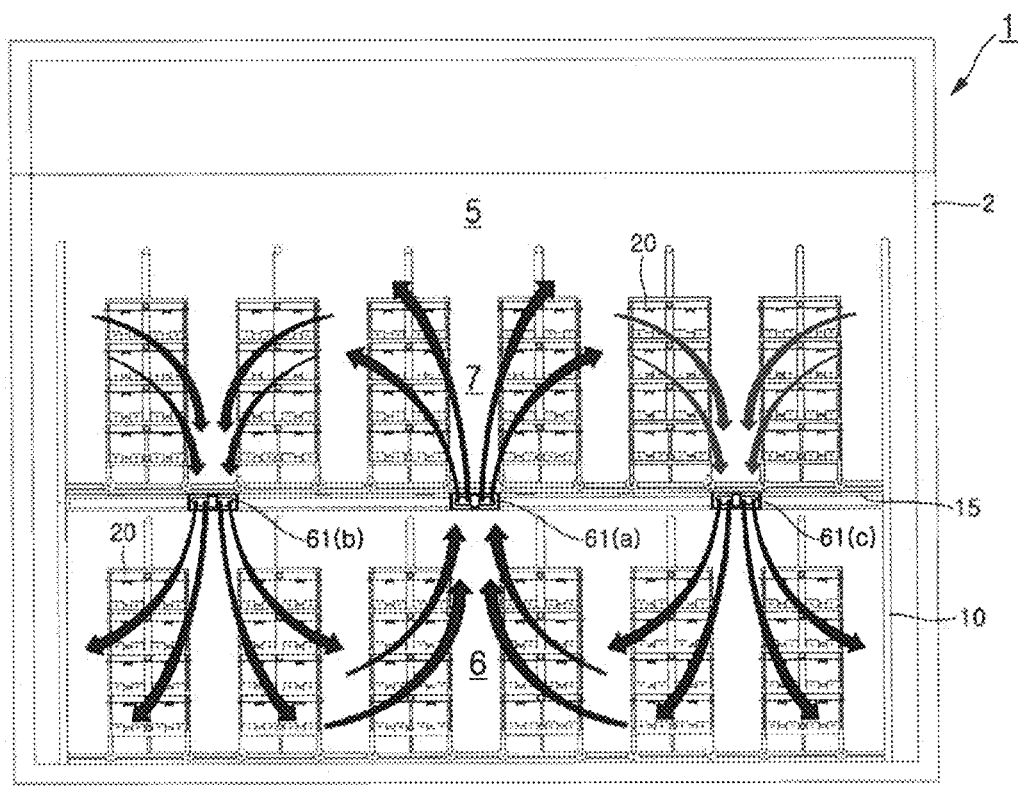

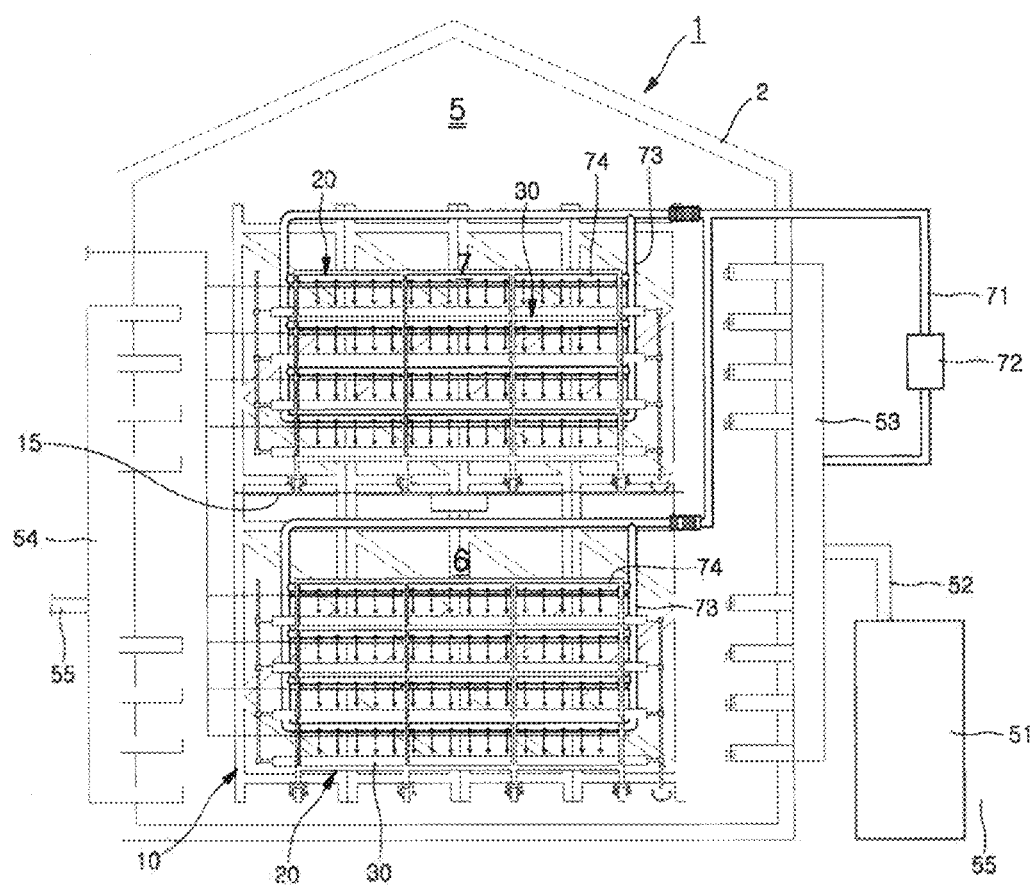
[FIG. 10]

[FIG. 11]
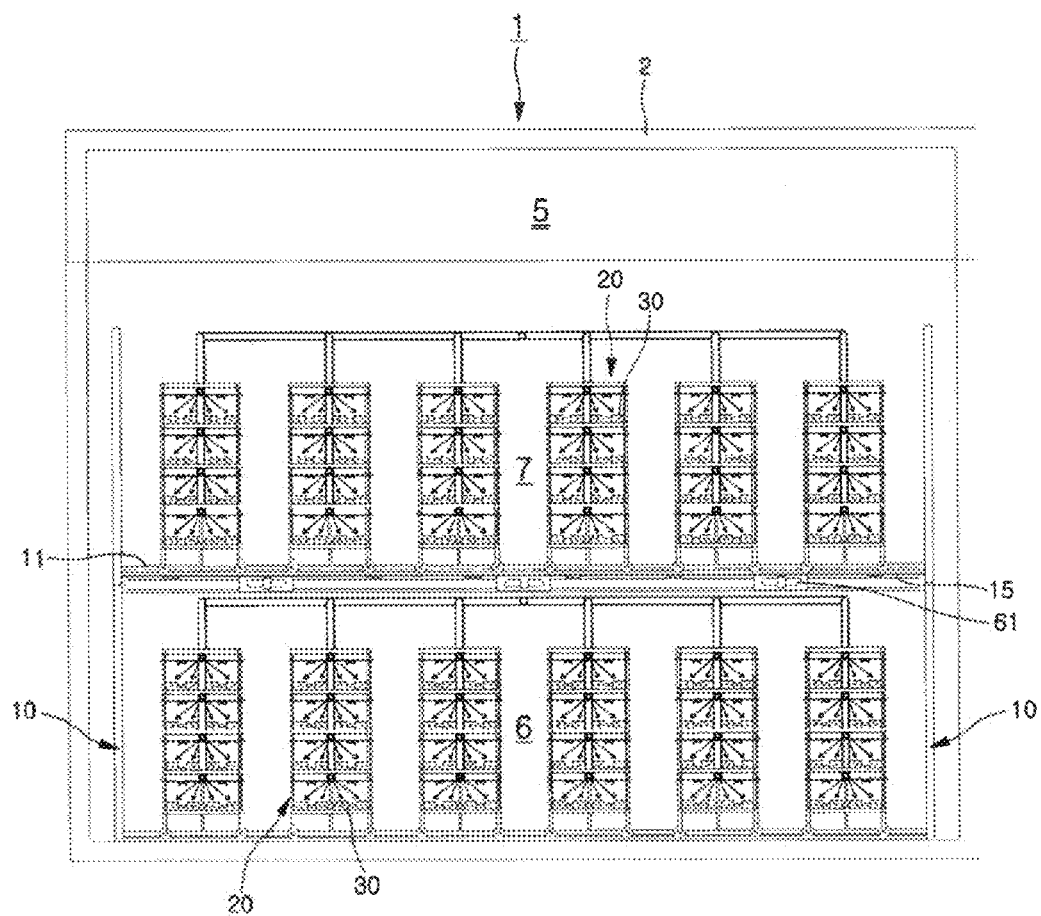

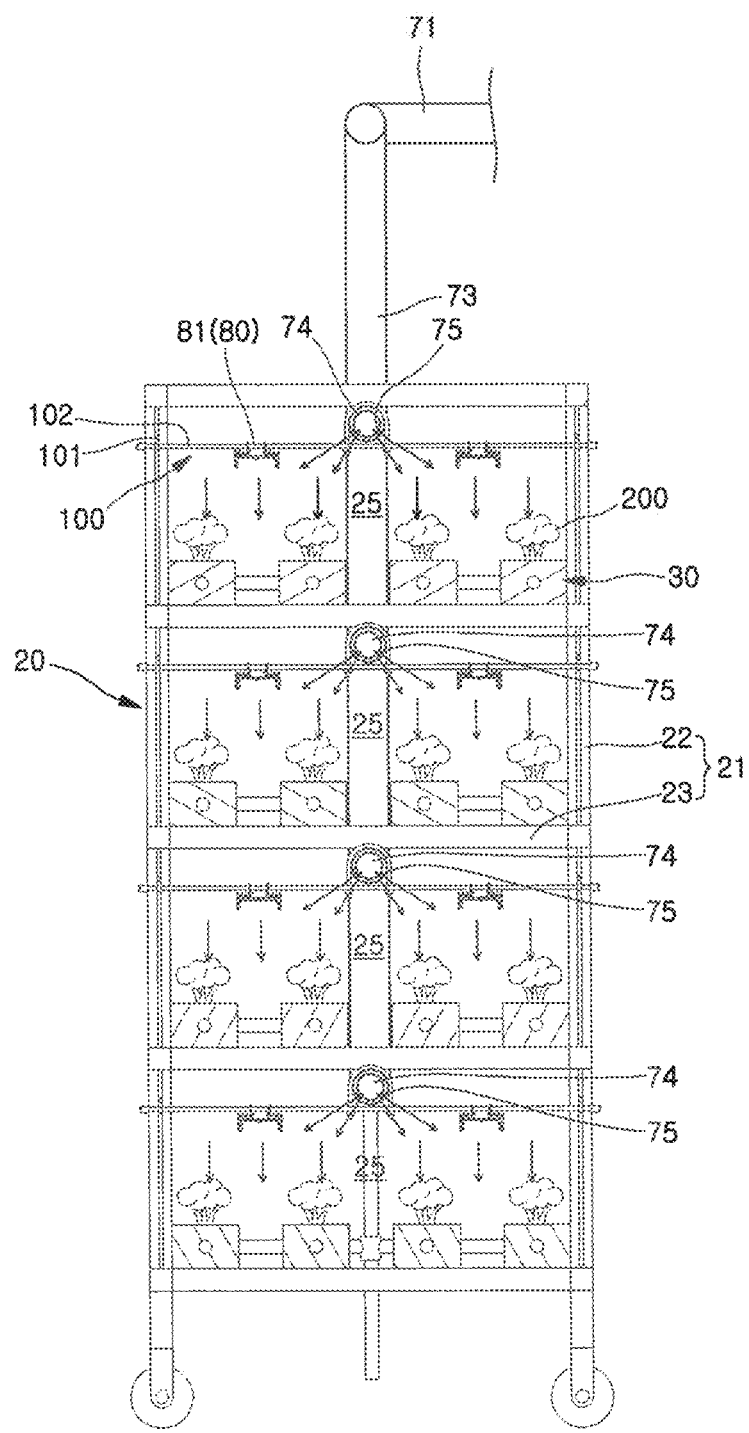
[FIG. 12]

[FIG. 13]
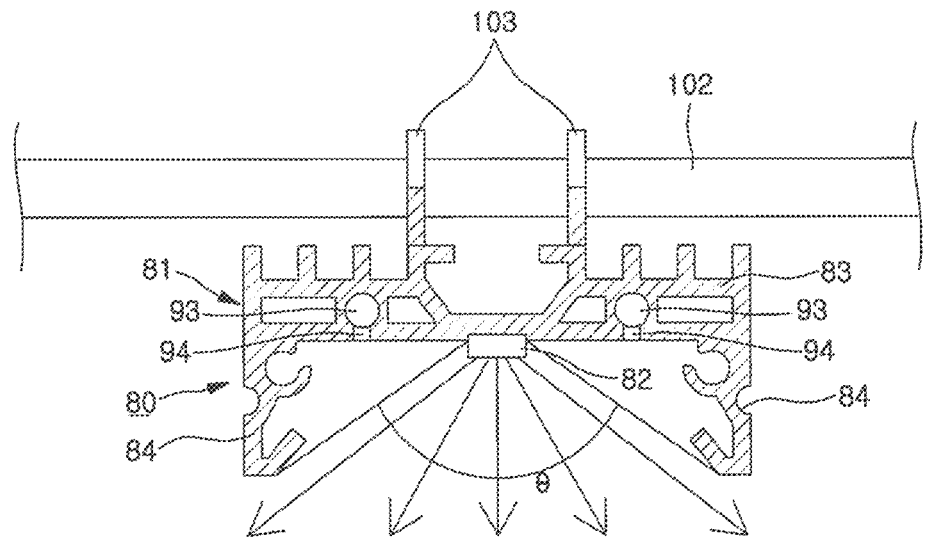
[FIG. 14]
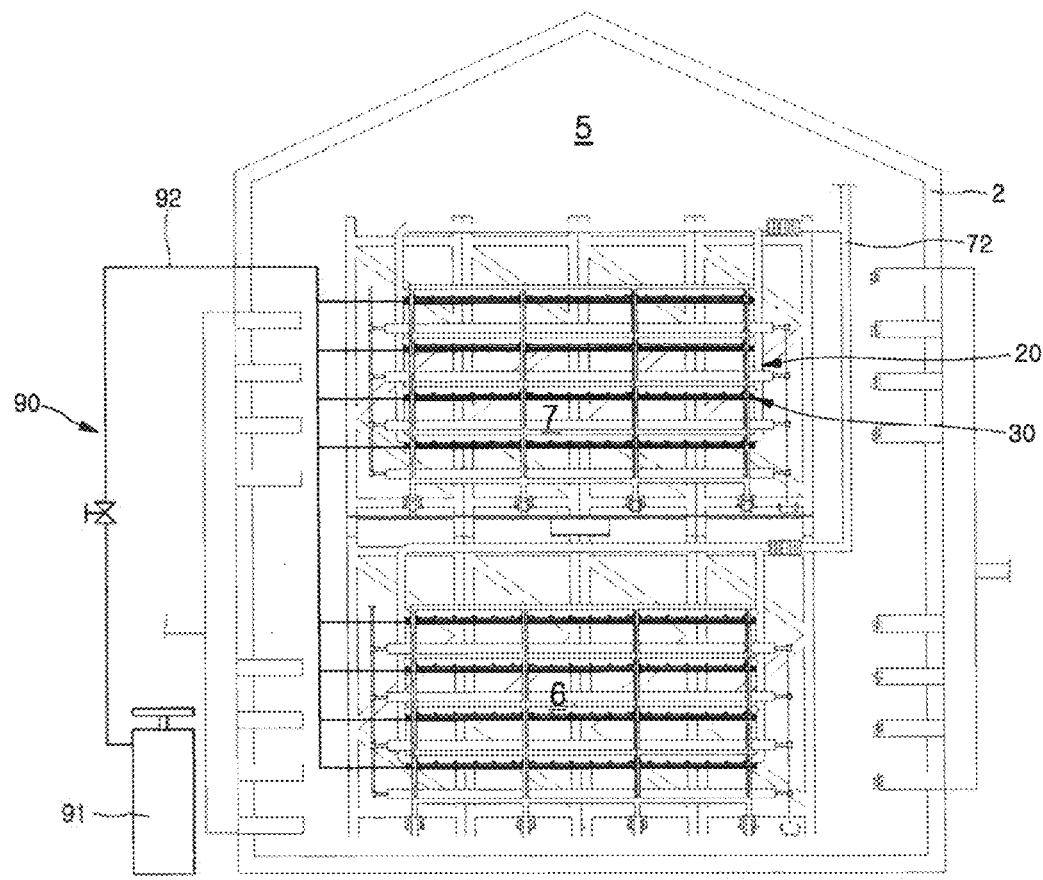

[FIG. 15]
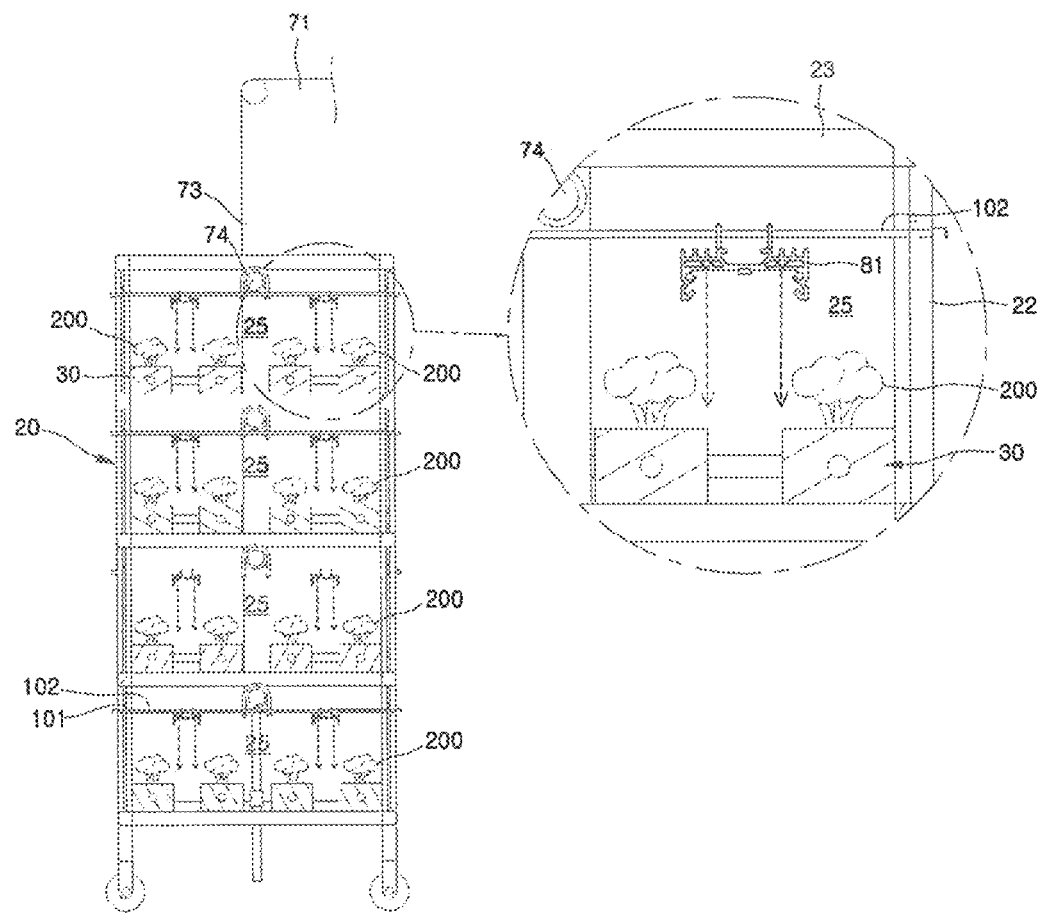

[FIG. 16]
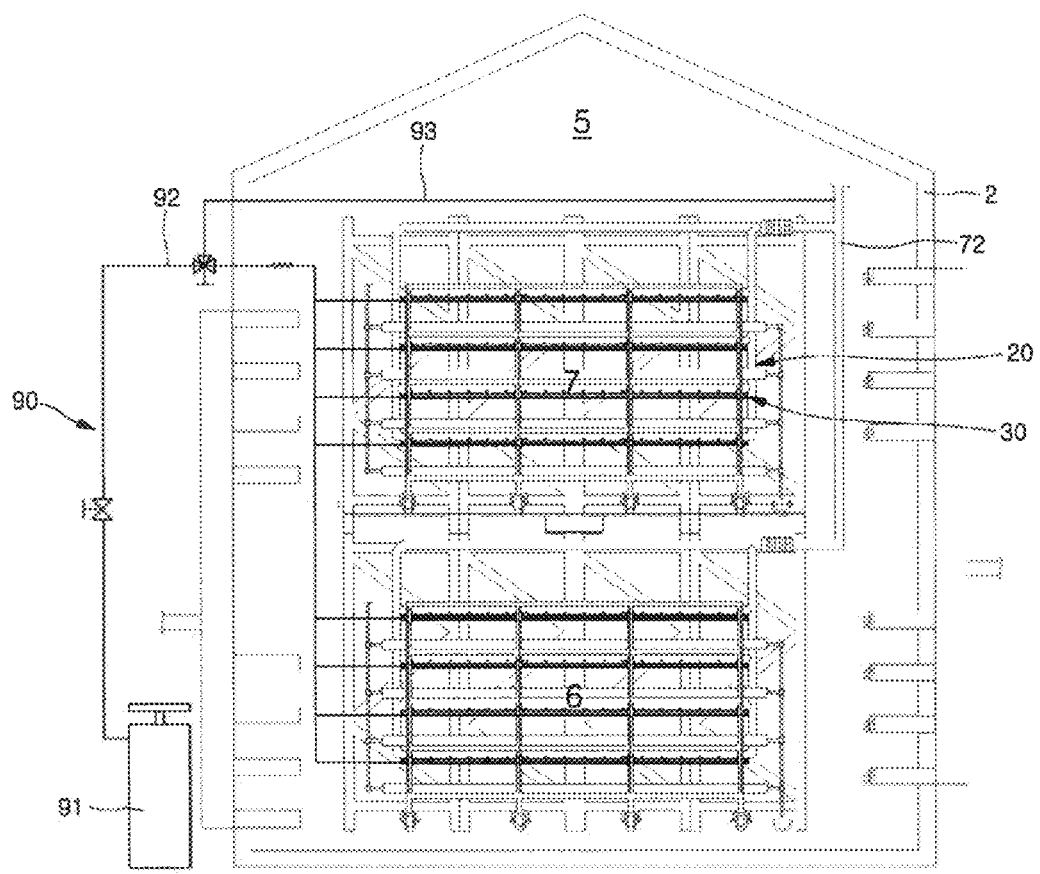

[FIG. 17]
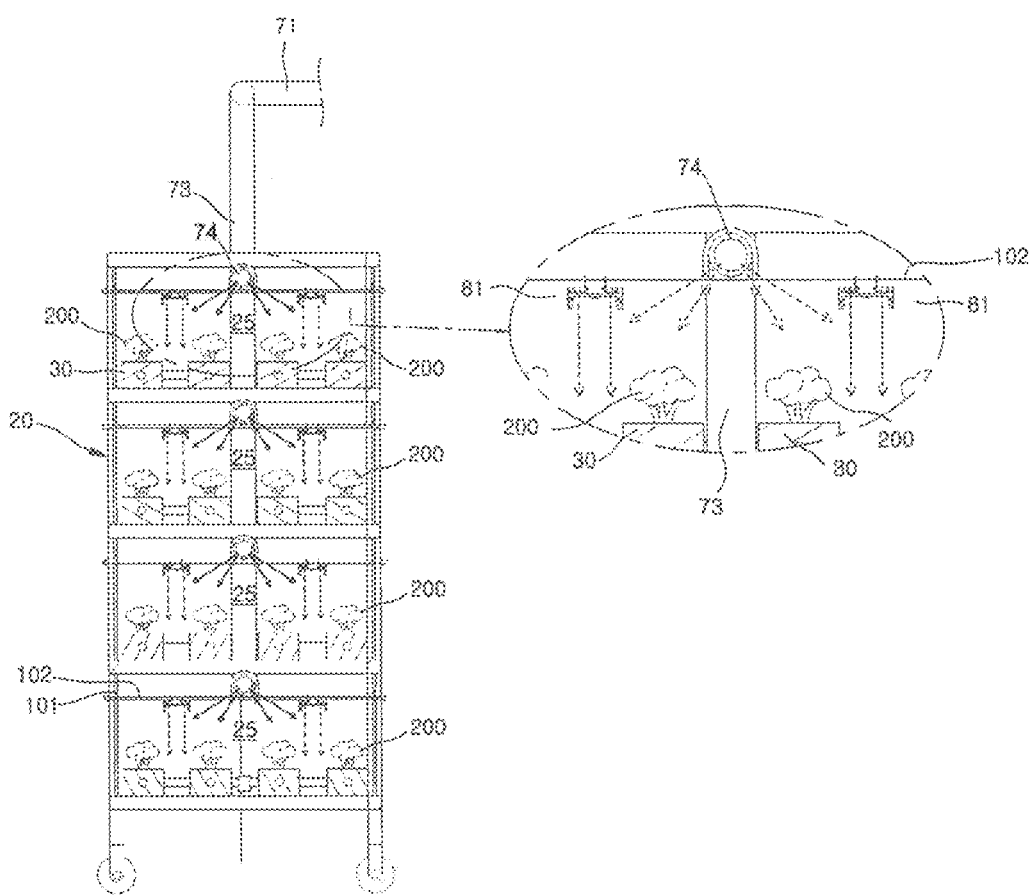

[FIG. 18]
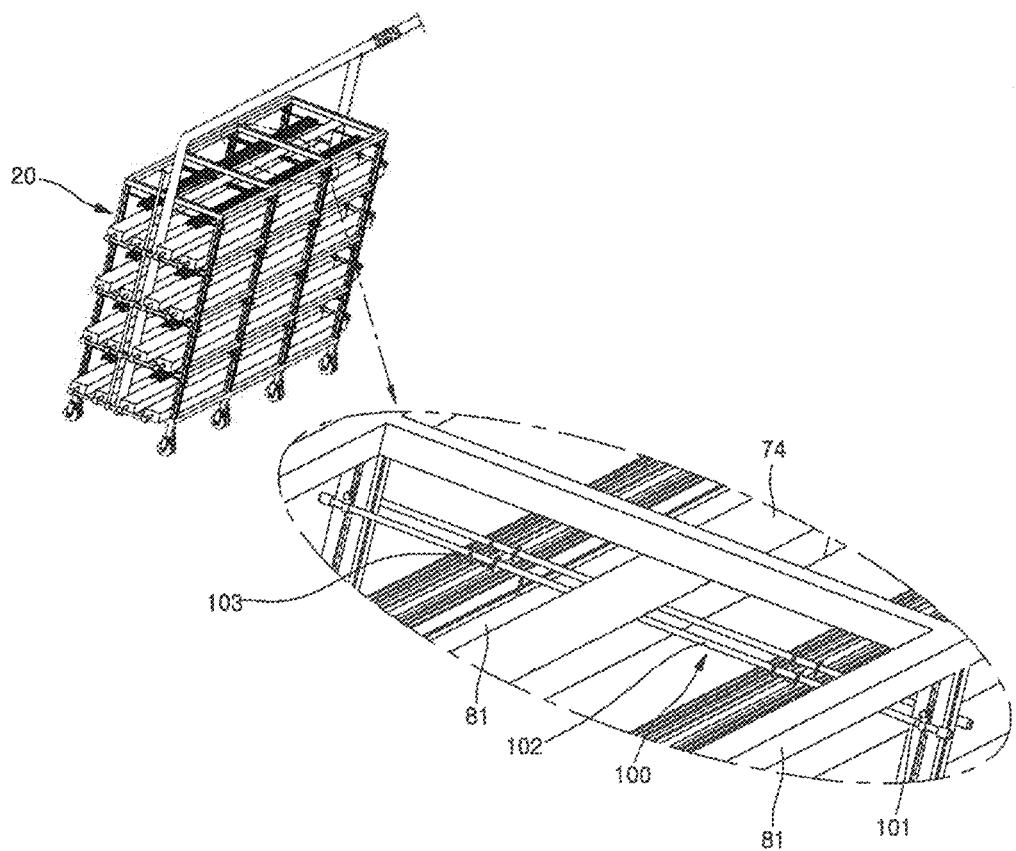

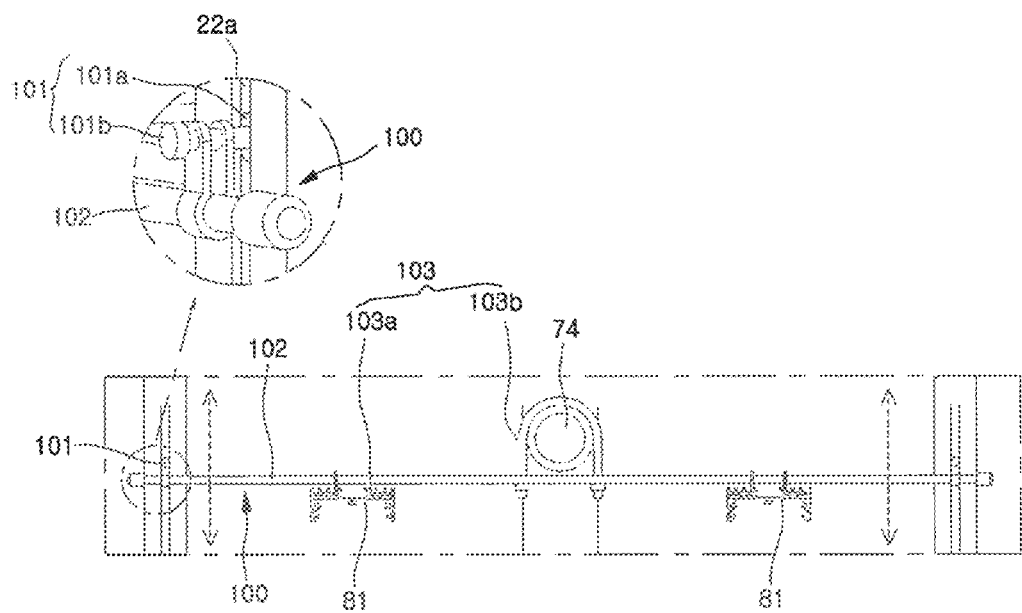
[FIG. 19]

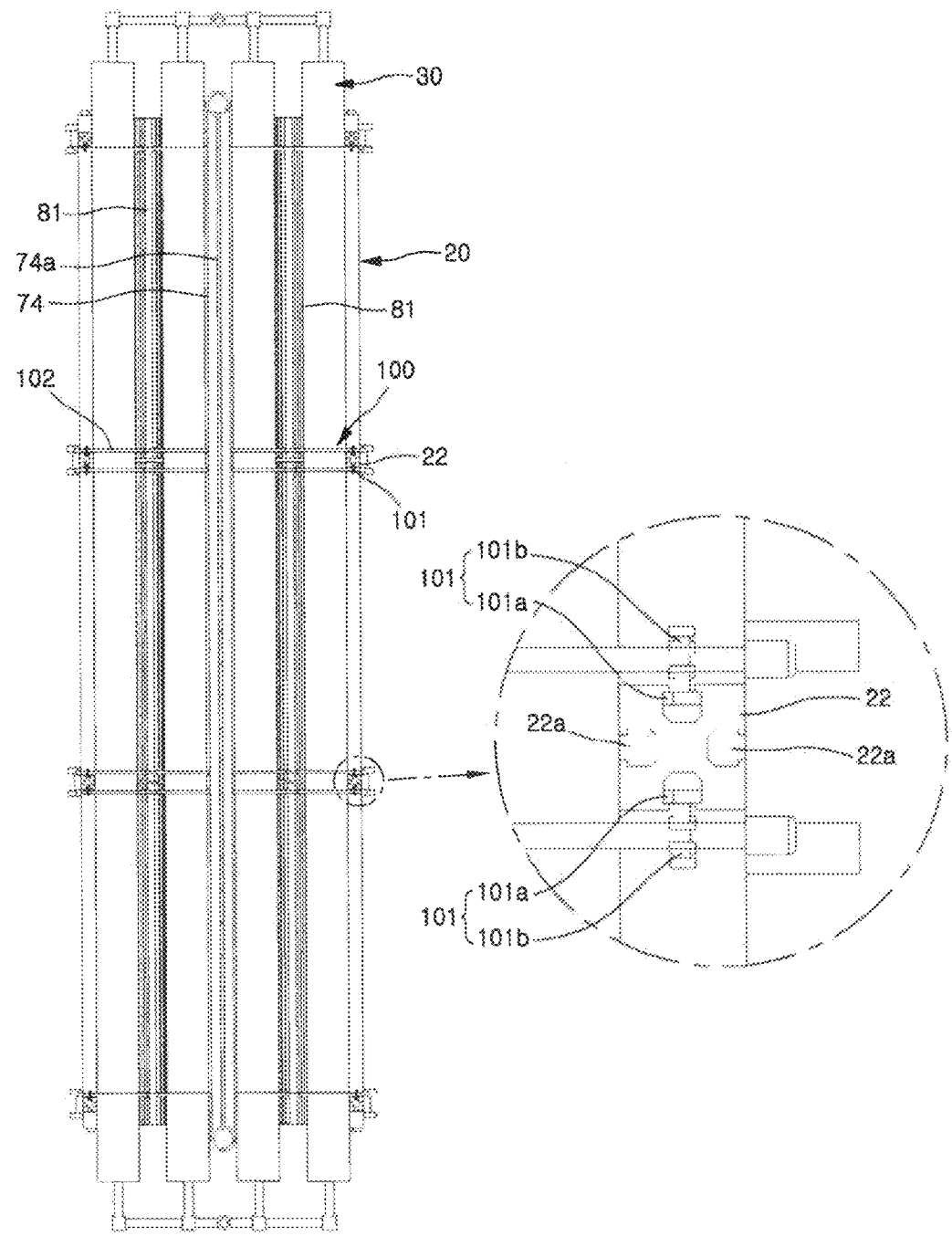
[FIG. 20]

PLANT FACTORY

TECHNICAL FIELD

The present invention relates to a plant factory, and more specifically to a plant factory capable of ultra-high density cultivating and obtaining high-quality crops with optimum productivity by utilizing a structure for the plant factory and a cultivation system installed in the structure.

BACKGROUND ART

As is well known, a plant factory using artificial light was started in Europe in 1957, and passed through a plant factory using natural sunlight that carried out plant cultivation through supplemental lighting, then developed into a fully controlled plant factory using only artificial light in the United States in the 1960s. Thereafter, in 1989, Japan has developed an artificial light source, and placed salad vegetables on the market, thereby having experienced a renaissance of the plant factory and securing plant factory-related technologies.

Nevertheless, most plant factories went bankrupt without producing desired profits due to poor profitability. In the meantime, after the Fukushima nuclear accident occurred in Japan in March 2011, mankind searched for safe food and is now experiencing a second renaissance of the plant factory.

At the same time, mankind is facing food shortages due to global warming and abnormal weather phenomena. In addition, due to the global environmental destruction caused by fine dust, heavy metal contamination, and a spread of diseases such as viruses, securing the safe food is becoming a new issue of mankind. Under such a backdrop, plant factories are required and are undergoing a commercialization process. However, as of 2015, 55% of companies have had a deficit in operation among 191 operated plant factories using artificial light in Japan, and only 23.5% of companies have maintained a break-even point (BEP). In this situation, plant factories still have great difficulties in terms of profitability.

The largest reason for such a deficit in profitability is a business aspect, but above all, because a level of completion of technologies such as a structure of the plant factory, lighting device, cultivation system, environmental control system, automation and energy saving is low. In addition, it seems that the deficit may be caused by insufficient selection of cultivars, seedling management, light control management, hydroponic cultivation, growth environment control, and crop production technology, as well as a low crop productivity.

The plant factories of Korea are in the same boat. In particular, considering a low utilization efficiency in terms of input costs per unit area of resources, it is necessary to construct the plant factory to account for an engineering aspect from the time of design thereof.

From the point of view of the productivity of agricultural products, despite the fact that system technology and crop production technology should be developed, installed, and operated in relation to each other under a precondition of yielding high quality products, these technologies are separately developed. Thereby, the plant factories have not yet achieved desired results up to now even though they secured excellent fundamental technologies.

As an example of the cases, a supplier who manufactures and installs a plant factory system develops a plant without neglecting the utilization efficiency of the input resource, and a consumer who introduces and uses it only operates the plant factory without knowing the mechanism thereof. As a result, the occurred problems cannot be solved, thereby resulting in a reduction in technological progress or business continuity.

Mobile plant cultivation systems have already been described in the prior patents, which mainly disclose an invention to easily just secure work spaces and work paths (Korean Patent Publication No. 10-1246782) and an invention to significantly improve yield productivity per unit area (Korean Patent Laid-Open Publication No. 10-2011-0096618). However, both of the inventions have been developed from a system or facility point of view, and are not the results of considering the utilization efficiency compared to the input resources in terms of plant cultivation technology and cultivation environment of crops to be grown, light and electric energy efficiencies and the like.

Success or failure of the plant factory should not only discuss the problem of excessive initial input costs at the time of construction, but also secure technologies that can reduce the costs through high productivity and produce results with a quality which is angled toward the consumer.

That is, it is necessary to complete in a direction in which a vertical plant factory technology should be analyzed and designed from the system point of view, then the plant factory is installed and made a trial run through R & D processes, followed by operating the same in a pilot scale. However, most plant factories have been limited only to the building structures and system technologies, and have not been optimized in construction cost reduction technologies of the plant factory, enhancement technologies of product quality, and cultivation technologies such as air flow, $CO_2$ diffusion and net photosynthetic rate (NPR), and transpiration to maximize productivity.

PRIOR ART DOCUMENT

Patent Document

Korean Patent Registration Publication No. 10-1246782 (registered on Mar. 18, 2013)

Korean Patent Laid-Open Publication No. 10-2011-0096618 (published on Aug. 31, 2011)

SUMMARY OF INVENTION

Problems to be Solved by Invention

In consideration of the above-mentioned circumstances, it is an object of the present invention to provide a plant factory capable of ultra-high density cultivating, which can increase utilization efficiency of carbon dioxide in the supplied air and a transpiration rate by smoothly maintaining a flow of air inside a plant structure forming the plant factory, and increase a light irradiation effect and a net photosynthetic rate depending on types of a cultivation system, as well as may physiologically control crops by adjusting temperature and humidity, which are complex factors, and maximize utilization efficiency of the input resources.

Means for Solving Problems

To achieve the above object, according to an aspect of the present invention, there is provided a plant factory including: a layer division support frame which is configured to divide an inside of a cultivation chamber into a plurality of cultivation layers, and includes a mesh-shaped floor formed between the divided cultivation layers to allow air to flow therebetween; a plurality of cultivation tables installed apart from each other in each cultivation layer divided by the layer division support frame; a plurality of planting beds installed to divide one or more planting layers in each cultivation table, on which plants are planted; a nutrient solution circulation supply unit configured to connect the planting beds with each other, and circulate and supply a nutrient solution required for plant growth; a cultivation chamber air circulation supply unit configured to generate a horizontal airflow in each cultivation layer inside the cultivation chamber, and circulate and supply air therein; an interlayer air circulation unit configured to generate an interlayer circulation airflow between the cultivation layers divided by the mesh-shaped floor of the layer division support frame; a cultivation table air supply unit configured to connect upper portions of the planting layers of each cultivation table and supply air so as to create a vertical downdraft inside the planting layers; an artificial light irradiation unit configured to irradiate the plants planted in the planting bed with a predetermined amount of light through an artificial light source provided on an upper side of the planting layers of each cultivation table; and a carbon dioxide gas supply unit which extends to the upper side of the planting layers of each cultivation table, and is configured to supply a carbon dioxide gas close to the plants.

Herein, each cultivation table preferably has a mobile rack structure which is horizontally movable along transfer rails formed on a bottom of each cultivation layer.

In addition, the cultivation chamber air circulation supply unit may include: a thermo-hygrostat configured to control a temperature and a humidity of the air circulated and supplied into the cultivation chamber, a cultivation chamber air supply pipe configured to supply air supplied from the thermo-hygrostat through air supply tubes formed corresponding to the respective cultivation layers on one side of the cultivation chamber while generating a horizontal airflow in each cultivation layer; and cultivation chamber air return pipes configured to allow the air supplied into the cultivation chamber to be returned to the thermo-hygrostat through air discharge tubes formed on the other side of the cultivation chamber corresponding to the respective cultivation layers.

The air supply tube may have a plurality of blades rotatably installed at an air supply end thereof to adjust an air supply amount and an air supply direction to be supplied into the cultivation chamber.

The interlayer air circulation unit may include a plurality of interlayer air circulation fans installed on a lower portion of the mesh-shaped floor forming a ceiling of each cultivation layer at a predetermined interval between the layer division support frames.

Herein, the interlayer air circulation fans are preferably installed so as to alternately generate up and down air circulations in one direction of each cultivation chamber, which are different circulation directions from each other.

In addition, the cultivation table air supply unit may include: a cultivation table air supply pipe which is branched from the thermo-hygrostat and extends corresponding to the respective cultivation tables of each cultivation layer; an in-line blowing fan provided on the cultivation table air supply pipe to pump and supply air branched and supplied from the thermo-hygrostat; vertical air supply pipes connected to an extending end portion of the cultivation table air supply pipe, and vertically disposed along at least one side of each cultivation table; and horizontal air spray pipes which are branched from the vertical air supply pipe corresponding to the respective planting layers of the cultivation table, thus to be horizontally disposed on the upper side of the planting layers, and include air spray holes formed therein at a predetermined interval in a longitudinal direction thereof so as to generate vertical downward airflows.

Further, the artificial light irradiation unit may include LED lighting devices installed on each planting layer of each cultivation table in a plurality of columns in a longitudinal direction thereof.

Herein, the LED lighting device may include: a heat dissipation plate installed on the upper side of each planting layer of the cultivation table in the longitudinal direction thereof; and LED elements installed in a central portion of a lower surface of the heat dissipation plate, wherein the heat dissipation plate includes, reflection plates which are formed at opposite ends of a lower surface thereof by vertically extending from the lower surface to limit an angle of irradiating the plants planted in the planting bed with a light emitted from the LED elements.

Herein, the reflection plate preferably extends so that the light emitted from the LED element is irradiated with an irradiation angle $\theta$ range within a range of 110° to 130°.

In addition, the heat dissipation plate may further include: at least one gas supply passage formed therein in a longitudinal direction thereof; and a plurality of gas spray holes formed therein to penetrate toward the plants planted in the planting beds on the gas supply passage at a predetermined interval along one side of the LED element.

Further, the carbon dioxide gas supply unit may include: a gas storage tank configured to store the carbon dioxide gas; and a gas supply pipe connected from the gas storage tank to the gas supply passages formed in the heat dissipation plates of the LED lighting device.

Further, the carbon dioxide gas supply unit may further include a gas additional connection pipe which is branched from the gas supply pipe and is connected to the cultivation table air supply pipe, such that the carbon dioxide gas is optionally supplied into the planting layers of the cultivation table through the vertical air supply pipe and the horizontal air spray pipe.

In addition, the plant factory may further include a height adjustment means configured to adjust spaced heights of the vertical air supply pipe, the horizontal air spray pipe, and the LED lighting device from the plants planted in each planting layer of the cultivation table.

Further, the height adjustment means may include: vertical height adjusters including adjuster bodies which are movably inserted into vertical guide grooves formed in a vertical frame of the cultivation table, and fixing screws configured to tighten the adjuster bodies to fix a vertical height thereof; at least one support whose opposite ends are tightened and fixed to the cultivation table so as to be installed in a transverse direction thereof in a state in which a height thereof is adjusted by the vertical height adjusters; and a support fastener serves to bind the horizontal air spray pipe and the LED lighting device to the support, and then hang them on the upper portion of the planting layer of the cultivation table to be fixed.

Furthermore, the nutrient solution circulation supply unit may include: a nutrient solution tank configured to store a nutrient solution; a nutrient solution supply pipe configured to connect the nutrient solution tank and one side of each of the planting beds of the respective cultivation tables; a vertical nutrient solution supply pipe which is installed on one side of the planting beds to connect one ends of the planting beds to each other, and is vertically disposed so as to supply the nutrient solution supplied from the nutrient solution supply pipe to the planting beds of each cultivation table; a nutrient solution circulation pump provided on the nutrient solution supply pipe to supply the nutrient solution into the planting beds forming the planting layers of each cultivation table; a vertical nutrient solution return pipe which is installed on the other side of the planting beds to connect the other ends of the planting beds to each other, and is configured to discharge the nutrient solution supplied to the planting bed to nutrient solution collect trenches formed in the respective cultivation layers; a nutrient solution return pipe which connects the nutrient solution collect trenches of each layer and the nutrient solution tank, and allows the nutrient solution collected in the nutrient solution collect trenches to be returned to the nutrient solution tank; and a nutrient solution regulator connected to the nutrient solution tank to adjust a concentration, acidity, temperature and oxygen concentration of the returned nutrient solution.

Advantageous Effects

According to the plant factory of the present invention, it is possible to provide effects as below. The mesh-shaped floor is formed through the layer division support frames inside the cultivation chamber, and the cultivation chamber is divided into the cultivation layers having a multi-layered structure of two or more layers by the floor, thereby minimizing input resources and maximizing space and energy utilization efficiencies.

In addition, a horizontal airflow is formed in the respective divided cultivation layers as a whole through the cultivation chamber air circulation supply unit, an interlayer circulation airflow is formed between the respective cultivation layers divided by the mesh-shaped floor through the interlayer air circulation unit, and a vertical downdraft is formed in the respective planting layers divided inside the cultivation table through the cultivation table air supply unit, thereby deviations in the temperature and carbon dioxide ($CO_2$) concentration may be reduced by evenly improving the airflow rate regardless of the place in the cultivation chamber, and productivity may be improved by increasing a net photosynthetic rate and a growth rate of plants.

Further, the flow of air in the cultivation chamber may be improved through the cultivation chamber air circulation supply unit, the interlayer air circulation unit, and the cultivation table air supply unit, thereby increasing a transpiration rate. In addition, in a process of flowing water ($H_2O$) in a nutrient solution through roots, stems, and leaves of a plant, then passing through final pores of the leaves and foliar boundary layers and moving to an indoor air, inorganic elements necessary for growth are also moved, such that the growth rate of plants may be increased. Further, in relation to physiological symptoms in a growth process of the plants, when growing leafy vegetables such as lettuce, it is possible to solve tip-burn (browning a tip and around the leaf), which occurs because a long period of time is consumed for moving a calcium component to the tip and around the leaf if the growth of the leaves is rapidly proceeded.

Further, a speed of the airflow may be homogeneously maintained through the cultivation chamber air circulation supply unit, the interlayer air circulation unit, and the cultivation table air supply unit. By injecting carbon dioxide into an air supply ventilation pipe and mounting the air spray pipe close to the leaves, an air resistance on the cultivation table may be reduced, and a resistance of the boundary layers around the leaves may be reduced, thereby increasing a diffusion efficiency of the carbon dioxide around the leaves.

Further, the net photosynthetic rate (NPR) may be increased through the artificial light irradiation unit and the carbon dioxide gas supply unit, together with the cultivation chamber air circulation supply unit, the interlayer air circulation unit, and the cultivation table air supply unit, thus to improve the productivity, and thereby increasing an airflow rate, which is a management factor that takes up a large portion in terms of the expenditure, temperature control, carbon dioxide concentration, and light quantity. In particular, in order to control a photosynthetic effective radiant flux density (PARD), which is an economic light quantity value, in a range of 147 to 205 $Wm^{-2}$, the air flow rate may be increased and the carbon dioxide concentration may be properly managed.

Furthermore, since the layer division support frame for dividing the cultivation layers having a multi-layered structure of two or more layers may be installed in an assembly type, the cultivation layers may be easily assembled, installed, and replaced, and thereby reducing entire costs. In particular, as the connection part of the adjustable cultivation table is detachably made, it is possible to easily transfer or repair the plant factory as necessary.

Furthermore, since the cultivation table is formed in an adjustable type rack mobile structure, the cultivation tables are collected in a light time, and thus an illumination area may be reduced, and the photosynthetic effective radiant flux density (PARD) may also be increased due to the close illumination of lighting and overlapping effect to save the energy.

BRIEF DESCRIPTION OF DRAWINGS

FIG. 1 is a perspective view schematically illustrating a plant factory according to an embodiment of the present invention.

FIG. 2 is a transverse sectional view of the plant factory shown in FIG. 1.

FIG. 3 is a longitudinal sectional view of the plant factory shown in FIG. 1.

FIG. 4 is a plan view of the plant factory shown in FIG. 1.

FIG. 5 is a perspective view of a unit cultivation table of the plant factory shown in FIG. 1.

FIG. 6 is a transverse sectional view schematically illustrating a nutrient solution flow diagram of the plant factory.

FIG. 7 is a transverse sectional view schematically illustrating an air circulation flow diagram in the cultivation chamber of the plant factory.

FIG. 8 is a perspective view schematically illustrating a cultivation chamber interlayer air circulation unit of the plant factory.

FIG. 9 is a longitudinal sectional view illustrating a state of interlayer air circulation through the cultivation chamber interlayer air circulation unit of the plant factory shown in FIG. 8.

FIG. 10 is a transverse sectional view schematically illustrating an air supply flow diagram in the cultivation table of the plant factory.

FIG. 11 is a longitudinal sectional view illustrating a flow of an entire vertical air induced through a cultivation table air supply unit shown in FIG. 10.

FIG. 12 is an enlarged cross-sectional view of the unit cultivation table illustrating the flow of the vertical air shown in FIG. 11.

FIG. 13 is a cross-sectional view of an LED lighting device forming an artificial light irradiation unit.

FIG. 14 is a transverse sectional view schematically illustrating a carbon dioxide gas supply flow diagram of the plant factory.

FIG. 15 is a cross-sectional view of the cultivation table illustrating a state in which carbon dioxide gas is supplied through a heat dissipation plate of the LED lighting device.

FIG. 16 is a transverse sectional view schematically illustrating a modified example of the carbon dioxide gas supply unit of the plant factory.

FIG. 17 is a cross-sectional view of the cultivation table illustrating a state in which carbon dioxide gas is supplied through the cultivation table air supply unit.

FIG. 18 is a partially enlarged perspective view illustrating a height adjustment means for the cultivation table air supply unit, the artificial light irradiation unit, and the carbon dioxide gas supply unit of the present embodiment.

FIG. 19 is a longitudinal sectional view of the unit cultivation table illustrating the height adjustment means shown in FIG. 18.

FIG. 20 is an enlarged transverse sectional view of the unit cultivation table illustrating the height adjustment means shown in FIG. 18.

MODE FOR CARRYING OUT INVENTION

Hereinafter, preferred embodiments of the present invention will be described in detail with reference to the accompanying drawings, so that persons having common knowledge in the technical field to which the present invention pertains may easily implement the invention. However, the present invention may be realized in various forms, and it is not limited to the embodiments described herein. In the drawings, publicly known functions and configurations that are judged to be able to make the purport of the present invention unnecessarily obscure will not be illustrated. Referring to the drawings, wherein like reference characters designate like or corresponding parts throughout the several views.

FIG. 1 is a perspective view schematically illustrating a plant factory according to an embodiment of the present invention, FIG. 2 is a transverse sectional view of the plant factory shown in FIG. 1, FIG. 3 is a longitudinal sectional view of the plant factory shown in FIG. 1, and FIG. 4 is a plan view of the plant factory shown in FIG. 1.

A plant factory 1 of the present embodiment includes a building structure 2 having a cultivation chamber 5 defined therein, layer division support frames 10, a plurality of cultivation tables 20, a plurality of planting beds 30, a nutrient solution circulation supply unit 40, a cultivation chamber air circulation supply unit 50, an interlayer air circulation unit 60, a cultivation table air supply unit 70, an artificial light irradiation unit 80, a carbon dioxide gas supply unit 90, and a height adjustment means 100.

First, the layer division support frames 10 are configured to divide an interior space of the cultivation chamber 5 formed inside the building structure 2 forming the plant factory 1 into a plurality of cultivation layers 6 and 7, and a mesh-shaped floor 15 is disposed between the divided lower cultivation layer 6 and the upper cultivation layer 7 to allow air to flow therebetween.

The present embodiment will describe an example in which the cultivation chamber 5 formed inside the building structure 2 is divided into two cultivation layers 6 and 7 by the layer division support frame 10, and the lower cultivation layer 6 and the upper cultivation layer 7 are divided to allow air to flow through the mesh-shaped floor 15.

However, the present invention is not necessarily limited thereto, and of course, it may be configured so that the cultivation chamber 5 formed inside the building structure 2 is divided into a multi-layered structure having two or more cultivation layers 6 and 7 to allow air to flow therebetween by the layer division support frames 10.

In addition, in the present invention, while the building structure 2 forming the cultivation chamber 5 occupies 57% of a cultivation area compared to a floor area, a vertical plant factory having a multi-layered structure of two or more layers is installed, whereby the cultivation area of the plants may be increased from total 8 to 16 times the floor area. Therefore, construction costs may be lowered, and 550 of the number of planting plants per pyeong (3.3 m$^2$) may be achieved in a planting density of at least 33% higher than the planting density of the plant factory 1 known to date, and thereby significantly increasing the productivity.

Meanwhile, the mesh-shaped floor 15 forms a top ceiling surface of the lower cultivation layer 6 divided thereby, and also forms a bottom surface of the upper cultivation layer 7.

In addition, the mesh-shaped floor 15 may be made of expanded metal having a mesh of a predetermined size (specifications of SWM 34, LWM 76.2, T 3.2-4.5, and W 4.0-5.0). Therefore, air circulation between the lower cultivation layer 6 and the upper cultivation layer 7 may be achieved by enabling air to flow therebetween through natural convection due to a difference in a temperature of the air, or air circulation between the layers may be achieved by air forcedly convected through an interlayer air circulation unit 60 described below.

The mesh-shaped floor 15 made of the expanded metal should be easy to install, withstand a weight of the cultivation table 20 placed on an upper side thereof, and prevent corrosion due to a nutrient solution or the like. In addition, there is a need for the floor to maintain a smooth flow of airflow through each mesh, and if necessary, it is preferable to be selected so as to help environmental control such as light irradiation coming down from the upper layer, temperature and humidity.

FIG. 5 is a perspective view of a unit cultivation table of the plant factory shown in FIG. 1.

Referring to FIG. 5 together with FIGS. 1 to 4, the cultivation tables 20 are installed apart from each other on each of the cultivation layers 6 and 7 divided by the layer division support frames 10.

The present embodiment will describe an example in which the cultivation table 20 is formed in a mobile rack structure made of extruded aluminum (Al), which has U-shaped pipe wheels 27 mounted on lower ends thereof so that each cultivation table is horizontally movable along transfer rails 26 (rail pipes made of stainless steel) formed on bottoms of the respective cultivation layers 6 and 7.

In addition, each of the cultivation tables 20 has an internal open space defined by cultivation table frames 21, wherein the space is divided into one or more planting layers, on which a plurality of planting beds 30 (made of PVC) are installed. The planting bed 30 has planting holes formed therein by penetrating upward to allow plants to be planted, and a water way formed therein. Thus, the nutrient solution flows through the waterway to nourish the plants planted in the planting holes.

Herein, the cultivation table frame 21 includes: vertical cultivation table frames 22 having a cross section so as to serve as a vertical guide groove 22a for height adjustment in a vertical direction and made of extruded aluminum; and horizontal cultivation table frames 23 configured to horizontally connect the vertical cultivation table frames and define an open space therein.

The present embodiment will describe an example in which the inside of the unit cultivation table 20 is divided into four planting layers 25, and four planting beds 30 are included therein, so that the respective planting layers 25 are fixed parallel to each other at an interval therebetween.

However, the present invention is not necessarily limited thereto, and it is obvious that the planting spaces having a multi-layer structure may be divided by a plurality of unit cultivation tables 20 depending on growth characteristics of the plants planted thereon.

Meanwhile, it is preferable that the cultivation tables 20 are installed so as to occupy a cultivation area corresponding to 50 to 65% of the floor area of each of the cultivation layers 6 and 7 divided by the layer division support frames 10.

In order to calculate the number of cultivation tables 20 to be arranged in each of the cultivation layers 6 and 7, first, considering the floor area (L×W) of the building structure 2 to be cultivated, a cultivation system (l1×w×H1) equipped with the cultivation table 20 having a standard (height and width) suitable for the characteristics of the cultivation crop is calculated, and then the number of cultivation tables 20 that can be placed in one layer is calculated by considering a workable margin factor and a planting area share (%, l×w/L×W).

Herein, considering a height H of the building structure and a height H1 of the cultivation table 20 and a clearance height between the layers, the total number of layers is calculated, and the total number of cultivation tables 20 to be installed in the building structure, in which the plant factory is to be arranged, is calculated. Then, when the number of planting beds 30 to be arranged in the individual cultivation system is determined, the total number of planting plants of the plant factory 1 is obtained.

When calculating the total number of planting plants as described above, an efficiency of input resources (investment costs or the number of cultivated plants/cultivation area) may be understood and construction of the plant factory 1 started from the time of design thereof, and the racks, on which the cultivation tables 20 will be placed, may be selected by determining an individual weight of the cultivation tables 20 and the total number of cultivation tables 20 at the time of design.

In addition, it is preferable that the height of the cultivation table 20 is set within a range of 1.7 m to 2 m similar to a height of a person, thereby allowing farmers to more easily carry out farming operations of planting, managing and harvesting the plants in the planting bed 30.

The nutrient solution circulation supply unit 40 is configured to connect the planting beds 30 dividing the planting layers 25 of the respective cultivation tables 20, and circulate and supply the nutrient solution required for plant growth.

FIG. 6 is a transverse sectional view schematically illustrating a nutrient solution flow diagram of the plant factory.

Referring to FIG. 6, in the present embodiment, the nutrient solution circulation supply unit 40 may include a nutrient solution tank 41, a nutrient solution supply pipe 42, vertical nutrient solution supply pipes 44, a nutrient solution circulation pump 43, vertical nutrient solution return pipes 45, a nutrient solution return pipe 47 and a nutrient solution regulator 48.

The nutrient solution tank 41 contains and stores a nutrient solution including essential nutrients required for plant growth.

Herein, as the nutrient solution, a mixture, in which sixteen elements required for plant growth, that is, nitrogen (N), phosphorus (P), potassium (K), calcium (Ca), magnesium (Mg), iron (Fe), chlorine (Cl), manganese (Mn), copper (Cu), boron (B), molybdenum (Mo), sulfur (S), carbon (C), hydrogen (H), oxygen (O) and zinc (Zn) are mixed in water, is used.

The sixteen elements are essential elements for the growth of plants, not artificial chemical fertilizers, and correspond to natural elements which are directly absorbed by the plants from soil. The nutrient solution may be prepared by mixing the above elements in an optimal composition ratio in accordance with the growth of planted plants 200.

The nutrient solution supply pipe 42 is configured to connect an outlet of the nutrient solution tank 41 and one side of each of the planting beds 30 of each cultivation table 20 through the vertical nutrient solution supply pipes.

The vertical nutrient solution supply pipe 44 vertically installed on one side of the cultivation table 20 connects one ends of the planting beds 30 to each other, and may evenly divide and supply the nutrient solution supplied through the nutrient solution supply pipe 42 into the planting beds 30 of each cultivation table 20.

Meanwhile, considering that the cultivation table 20 is an adjustable mobile rack structure as described above, it is preferable to connect the nutrient solution supply pipe 42 and the vertical nutrient solution supply pipe 44 using a flexible pipe having an adjustable length according to a moving distance of the cultivation table. In this case, it is preferable that the flexible pipe structure is configured so as not to be twisted or tangled according to a movement of the cultivation table 20.

The nutrient solution circulation pump 43 is provided on the nutrient solution supply pipe 42 to pump and supply the nutrient solution filled in the nutrient solution tank 41 into the planting beds 30 installed in the planting layers 25 of each cultivation table 20.

The vertical nutrient solution return pipe 45 installed on the other side of the planting beds 30 connects the other ends of the planting beds 30 to each other, and discharges the nutrient solution supplied to the planting beds 30 to nutrient solution collect trenches 46 formed in each of the cultivation layers 6 and 7.

The nutrient solution return pipe 47 connects the nutrient solution collect trenches 46 of each layer and the nutrient solution tank 41, and allows the nutrient solution collected in the nutrient solution collect trenches 46 to be returned to the nutrient solution tank 41.

Further, the nutrient solution regulator 48 includes a concentration controller, an acidity controller, a temperature controller, an oxygen concentration controller, and the like, and is configured to adjust a concentration (EC) of the nutrient solution returned to the nutrient solution tank 41, an acidity (pH) of the nutrient solution, a supply temperature (T) of the nutrient solution, and an oxygen concentration (DO) inside the nutrient solution.

Meanwhile, although not shown in detail in the drawings, respective measurement sensors for measuring the concentration, acidity, temperature and oxygen concentration of the nutrient solution in the nutrient solution tank 41 may be installed therein, such that, by automatically controlling the concentration controller, acidity controller, temperature controller and oxygen concentration controller of the nutrient solution regulator 48 based on information measured from these measurement sensors, it is possible to adjust the concentration, acidity, temperature and oxygen concentration of the nutrient solution to respective preset values.

In the plant factory 1 of the present embodiment, the nutrient solution is continuously supplied to the planting beds 30 through the above-described nutrient solution circulation supply unit 40, and the nutrient solution is evenly and automatically supplied by systematically adjusting the concentration, acidity, temperature and oxygen concentration thereof, while continuously managing microorganisms and pathogens in the nutrient solution to prevent contamination, through the nutrient solution regulator 48.

In addition, the present embodiment has described an example in which the nutrient solution circulation supply unit 40 consists of only one nutrient solution tank line, but of course, it may be configured to operate a plurality of nutrient solution tank lines in accordance with the growth of the planted plants 200, so as to supply nutrient solutions of recipes different from each other according to a planted crop group.

The cultivation chamber air circulation supply unit 50 is configured to generate a horizontal airflow in each of the cultivation layers 6 and 7 inside the cultivation chamber 5, and circulate and supply the generated air therein.

FIG. 7 is a transverse sectional view schematically illustrating an air circulation flow diagram in the cultivation chamber of the plant factory.

Referring to FIG. 7, the cultivation chamber air circulation supply unit 50 includes a thermo-hygrostat 51, a cultivation chamber air supply pipe 52, air supply tubes 53, air discharge tubes 54 and cultivation chamber air return pipes 55.

The thermo-hygrostat 51 is configured to supply air by controlling a temperature and a humidity of the air circulated and supplied to the cultivation chamber 5 through a cooler, a heater, and a humidifier having a dehumidification function, which are provided therein, according to a cultivation environment of the planted plants 200.

The cultivation chamber air supply pipe 52 is configured to supply air supplied from the thermo-hygrostat 51 into the cultivation layers 6 and 7 through the air supply tubes 53 formed on one side of the cultivation chamber 5 corresponding to the respective cultivation layers 6 and 7, such that the air flows in these cultivation layers while creating a horizontal airflow.

Herein, the air supply tube 53 preferably includes a plurality of blades 53a rotatably installed at an air supply end thereof so as to adjust an air flow rate and an air supply direction supplied into the cultivation chamber 5.

In addition, the cultivation chamber air return pipe 55 connects the air discharge tubes 54 formed on the other side of the cultivation chamber 5 corresponding to the respective cultivation layers 6 and 7 and the thermo-hygrostat 51, thereby allowing the air discharged from the inside of the cultivation chamber 5 to be returned to the thermo-hygrostat.

As described above, the air is circulated and supplied through the cultivation chamber air circulation supply unit 50 while generating the horizontal airflow in each of the cultivation layers 6 and 7 inside the cultivation chamber 5, thereby it is possible to more uniformly maintain the entire temperature and humidity of the air in the respective cultivation layers 6 and 7 through the thermo-hygrostat 51. In addition, by managing the ventilation number in a range of 0.01 to 0.02 per hour so as to prevent an outside air from flowing into the cultivation chamber 5, it is possible to minimize a loss of carbon dioxide inside the cultivation chamber 5.

The interlayer air circulation unit 60 is configured to create an interlayer circulation airflow by forcedly circulating air through a plurality of interlayer air circulation fans 61 between the cultivation layers 6 and 7 defined by the mesh-shaped floor 15 of the layer division support frames 10.

FIG. 8 is a perspective view schematically illustrating a cultivation chamber interlayer air circulation unit of the plant factory, and FIG. 9 is a longitudinal sectional view illustrating a state of interlayer air circulation through the cultivation chamber interlayer air circulation unit of the plant factory shown in FIG. 8.

Referring to FIGS. 8 and 9, a plurality of interlayer air circulation fans 61 (61(*a*), 61(*b*) and 61(*c*)) included in the cultivation chamber interlayer air circulation unit 60 may be installed on a lower portion of the mesh-shaped floor 15 forming a ceiling of the cultivation layer 6 at a predetermined interval between the layer division support frames 10.

In particular, it is preferable that the interlayer air circulation fans 61 (61(*a*), 61(*b*) and 61(*c*)) are installed so as to alternately generate up and down air circulations in one direction of each cultivation chamber, which are different circulation directions from each other.

The present embodiment will describe an example in which three interlayer air circulation fans 61 (61(*a*), 61(*b*) and 61(*c*)) are installed on the lower portion of the mesh-shaped floor 15 at the predetermined interval in a longitudinal direction thereof between the layer division support frames 10. Among them, the circulation fan 61(*a*) installed in the middle is configured to circulate air toward the lower layer, and opposite interlayer air circulation fans 61(*b*) and 61(*c*) adjacent thereto are configured to circulate air toward the upper layer, so that the interlayer air circulation fans 61 (61(*a*), 61(*b*) and 61(*c*)) generate air circulation directions different from each other.

Therefore, while the air supplied to the upper cultivation layer 7 and the air supplied to the lower cultivation layer 6 by the interlayer air circulation fans 61 (61(*a*), 61(*b*) and 61(*c*)) are forcedly circulated therebetween, the temperature and humidity of the generated air are uniformly maintained, and thereby, it is possible to create a uniform plant cultivation environment between the upper and lower cultivation layers 6 and 7 divided inside the cultivation chamber 5.

The cultivation table air supply unit 70 is configured to connect upper portions of the planting layers 25 of each cultivation table 20 and generate a vertical downdraft inside the planting layers 25.

FIG. 10 is a transverse sectional view schematically illustrating an air supply flow diagram in the cultivation table of the plant factory, FIG. 11 is a longitudinal sectional view illustrating a flow of an entire vertical air induced through the cultivation table air supply unit shown in FIG. 10, and FIG. 12 is an enlarged cross-sectional view of the unit cultivation table illustrating the flow of the vertical air shown in FIG. 11.

Referring to FIGS. 10 to 12, the cultivation table air supply unit 70 includes a cultivation table air supply pipe 71, an in-line blowing fan 72, vertical air supply pipes 73, and horizontal air spray pipes 74.

The cultivation table air supply pipe 71 is branched from the thermo-hygrostat 51 and is configured to extend corresponding to the respective cultivation tables 20 of the respective cultivation layers 6 and 7.

The in-line blowing fan 72 is provided on the cultivation table air supply pipe 71 to pump and supply air with controlled temperature and humidity, which is branched and supplied from the thermo-hygrostat 51, into the cultivation table.

The vertical air supply pipes 73 are connected to an extending end portion of the cultivation table air supply pipe 71, and are vertically disposed along at least one side of each cultivation table 20.

Further, the horizontal air spray pipes 74 are branched from the vertical air supply pipe 73 corresponding to the respective planting layers 25 of the cultivation table 20, thus to be horizontally disposed along the upper side of each planting layer 25, and include air spray holes 75 formed therein at a predetermined interval in the longitudinal direction thereof so as to generate vertical downward airflows.

Herein, the vertical air supply pipes 73 and the horizontal air spray pipes 74 are integrally formed by connecting with each other. The integrally formed vertical air supply pipes 73 and the horizontal air spray pipes 74 are configured to allow an air spray height thereof to be more freely adjusted according to growth heights of the plants 200 planted in the planting beds 30 in each planting layer 25 of the cultivation table 20 through a height adjustment means 100 described below.

Meanwhile, it is preferable that the cultivation table 20 is formed in the movable mobile rack structure as described above, and the cultivation table air supply pipe 71 and the vertical air supply pipes 73 are connected using a flexible pipe having an adjustable length, so as to control the height thereof within each planting layer 25 of the cultivation table 20 by the height adjustment means 100.

As described above, the cultivation table air supply unit 70 connects the upper portions of the planting layers 25 of each cultivation table 20, and creates vertical downdrafts inside the planting layers 25, thereby generating a vertical downward flow inside each planting layer 25 in which the plants 200 are planted, so as to allow the air to more smoothly flow, when the cultivation tables 20 are located in air congested sections in the respective cultivation layers 6 and 7.

Furthermore, together with the horizontal flow of air generated by the cultivation chamber air circulation supply unit 50 and/or the flow of interlayer air generated by the interlayer air circulation unit 60 as described above, the vertical downward flow of air generated by the cultivation table air supply unit 70 is added thereto. Therefore, by the occurred vortex phenomenon, it is possible to effectively eliminate an air congestion phenomenon that may occur between the cultivation tables 20 close to each other due to movement and arrangement thereof. As a result, it is possible to create a more uniform growth environment of the plants.

The artificial light irradiation unit 80 irradiates the plants 200 planted in the planting bed 30 with a preset amount of light by using a power source supplied through an electric wire to an artificial light source provided on the upper side of the planting layers 25 of each cultivation table 20.

FIG. 13 is a cross-sectional view of an LED lighting device forming the artificial light irradiation unit.

Referring to FIG. 13, the present embodiment will describe an example in which the artificial light irradiation unit 80 includes LED lighting devices 81 installed on each planting layer 25 of the cultivation table 20 with being formed in one or more columns in the longitudinal direction thereof.

Herein, the LED lighting device 81 includes: a heat dissipation plate 83 installed on the upper side of each planting layer 25 of the cultivation table 20 in the longitudinal direction thereof; and LED elements 82 installed in a central portion of a lower surface of the heat dissipation plate 83.

Generally, about 35% of a light energy emitted from the lighting device is absorbed by leaves of the plant, and the remaining 65% is irradiated to the top, floor, wall, etc. of the cultivation room, and finally converted into a thermal energy which is not of any help to cultivate the plant. At this time, in order to reduce an input energy of the plant factory, it is absolutely necessary to increase an efficiency of lighting required for photosynthesis.

For this, the heat dissipation plate 83 has a reflection plate 84 that extends from opposite ends of the lower surface of the heat dissipation plate 83, such that an irradiation angle θ of irradiating the plants 200 planted in the planting bed 30 with the light emitted from the LED elements 82 may be limited within a predetermined range in the longitudinal direction thereof.

At this time, it is preferable that a height of the reflection plate 84 is set so that the light emitted from the LED elements 82 is irradiated with an irradiation range within a range of 110° to 130°.

In addition, the LED lighting device 81 is configured to adjust the height thereof according to the growth heights of the plants planted in the planting beds 30 in each planting layer 25 of the cultivation table 20 through the height adjustment means 100 described below.

Therefore, due to the configuration of adjusting the light irradiation height in each planting layer 25 of the cultivation table 20, and limiting the irradiation angle θ within the range of 110° to 130° (most preferably, 120°) through the reflection plate 84, it is possible to more intensively irradiate the plants with the light inside the planting layers 25 of the cultivation table 20. Therefore, the electric energy may be reduced by improving lighting effects required for photosynthesis of the plants.

Meanwhile, the heat dissipation plate 83 included in the LED lighting device 81 of the present embodiment may include one or more gas supply passages 93 formed therein in the longitudinal direction thereof so as to more easily dissipate heat generated therein from the LED elements 82, and secure a gas supply flow path for supplying a carbon dioxide gas described below, and a plurality of gas spray holes 94 which are formed therein to penetrate toward the plants planted in the planting beds 30 on the gas supply passage 93 at a predetermined interval along one side of the LED element 82.

The carbon dioxide gas supply unit 90 extends to the upper side of the planting layers 25 of each cultivation table 20, thus to directly spray and supply carbon dioxide gas necessary for photosynthesis close to the planted plants 200.

FIG. 14 is a transverse sectional view schematically illustrating a carbon dioxide gas supply flow diagram of the plant factory, and FIG. 15 is a cross-sectional view of the cultivation table illustrating a state in which the carbon dioxide gas is supplied through the heat dissipation plate of the LED lighting device.

Referring to FIGS. 14 and 15, the carbon dioxide gas supply unit 90 of the present embodiment includes: a gas storage tank 91 which contains and stores the carbon dioxide gas; and a gas supply pipe 92 which connects the gas storage tank 91 and the gas supply passages 93 formed in the heat dissipation plate 83 of the LED lighting device 81, thus to supply the carbon dioxide gas from the gas storage tank to the cultivation table.

Therefore, the carbon dioxide gas stored in the gas storage tank 91 is supplied into the heat dissipation plate 83 of each of the LED lighting devices 81 through the gas supply pipe 92, and is directly sprayed and supplied to the plants 200 planted in the planting beds 30 of each cultivation table 20 with being close thereto through the gas supply passages 93 and the gas spray holes 94 formed in each heat dissipation plate 83. Thus, a diffusion rate of the carbon dioxide gas may be increased.

Meanwhile, as described above, the LED lighting device 81 is installed inside each planting layer 25 of the cultivation table 20 in a height adjustable manner by the height adjustment means 100 described below, such that the light and carbon dioxide gas required for the photosynthesis of the plants may be more uniformly supplied in the controlled amount and concentration by adjusting the height from which the carbon dioxide gas is supplied together with the amount of light.

However, the carbon dioxide gas supply unit 90 of the present invention is not necessarily limited to the configuration in which the carbon dioxide gas is directly sprayed and supplied to the plants through the gas supply passage 93 and the gas spray holes 94 formed in the heat dissipation plate 83 of the above-described LED lighting device, and of course, it may be configured to supply the carbon dioxide gas to the plants through the above-described cultivation table air supply unit.

FIG. 16 is a transverse sectional view schematically illustrating a modified example of the carbon dioxide gas supply unit of the plant factory, and FIG. 17 is a cross-sectional view of the cultivation table illustrating a state in which the carbon dioxide gas is supplied through the cultivation table air supply unit.

Referring to FIGS. 16 and 17, one modified example of the carbon dioxide gas supply unit 90 is configured to further include a gas additional connection pipe 93.

Herein, one end of the gas additional connection pipe 93 is branched from the gas supply pipe 92 and the other end thereof is connected to the cultivation table air supply pipe 71 for supplying the carbon dioxide gas, such that the carbon dioxide gas is optionally supplied into the planting layers 25 of the cultivation table 20 through the vertical air supply pipe 73 and the horizontal air spray pipe 74 together with the heat dissipation plate of the LED lighting device.

As described above, the carbon dioxide gas is supplied to the supplied air so as to generate a downward airflow into the planting layers 25 of the cultivation table 20 through the vertical air supply pipe 73 and the horizontal air spray pipe 74 of the cultivation table air supply unit 70. Therefore, the diffusion rate of the carbon dioxide gas in the air may be more effectively increased.

Further, the height adjustment means 100 adjusts the spaced heights of the horizontal air spray pipe 74 and the LED lighting device 81 for supplying the carbon dioxide gas to the plants 200 planted in each the planting layer 25 of the cultivation table 20.

FIG. 18 is a partially enlarged perspective view illustrating the height adjustment means for the cultivation table air supply unit, the artificial light irradiation unit, and the carbon dioxide gas supply unit of the present embodiment, FIG. 19 is a longitudinal sectional view of the unit cultivation table illustrating the height adjustment means shown in FIG. 18, and FIG. 20 is an enlarged transverse sectional view of the unit cultivation table illustrating the height adjustment means shown in FIG. 18.

Referring to FIGS. 18 to 20, the present embodiment will describe an example in which the height adjustment means 100 includes vertical height adjusters 101, supports 102, and support fasteners 103.

The height adjuster 101 includes: adjuster bodies 101a which are movably inserted into the vertical guide grooves 22a formed in the vertical frame 22 of the cultivation table 20 in the horizontal direction; and fixing screws 101b that tighten the adjuster bodies 101a to be fixed in accordance with a preset vertical height.

The support 102 has the height adjusters 101 fixed to opposite ends thereof, thus to be installed in the transverse direction of the cultivation table 20 at the height adjusted by the adjusters.

In addition, the support fastener 103 serves to bind the horizontal air spray pipe 74 and the LED lighting device 81 to the support 102, and then hang them on the upper portion of the planting layer 25 of the cultivation table 20 to be fixed.

The present embodiment has described an example in which the height adjustment means 100 serves to fix the adjuster bodies 101a through the fixing screws 101b of the height adjuster 101, and adjust the height of the horizontal air spray pipe 74 and the LED lighting device 81 through this, but the present invention is not necessarily limited thereto. For example, of course, it may be configured to perform the vertical movement and fixation along the vertical guide grooves 22a formed in the vertical frame 22 of the cultivation table 20 by using driving cylinders or driving motors.

As described above, due to the configuration of adjusting the height of the horizontal air spray pipe 74 and the LED lighting device 81 through the height adjustment means 100, it is possible to more freely control the supply of air supplied for generating a vertical downdraft through the horizontal air spray pipe 74, the light irradiation through the LED lighting device 81, and the supply height of the carbon dioxide gas through the above configuration.

Meanwhile, although not shown in the drawings, each of the cultivation layers 6 and 7 of the cultivation chamber 5 and the planting layers 25 of each cultivation table 20 may further include: an airflow meter (model name: ST-111, Sinyoung Choukki Co., Ltd.) for measuring flow rates of airflows formed through the above-described cultivation chamber air circulation supply unit 50, the interlayer air circulation unit 60, and the cultivation table air supply unit 70; a temperature and humidity meter (model name: DT-802, CEM Co., Ltd.) for specifying the temperature and humidity of the air; and a carbon dioxide meter (model name: GC-2028, manufactured by Lutron Electronic Enterprise Co., Ltd.) for measuring the concentration of carbon dioxide in the air naturally occurring and supplied through the carbon dioxide gas supply unit 90.

Hereinafter, experimental results comparing the plant factory 1 according to the embodiment of the present invention and the conventional plant factory will be described below through a comparative example.

Comparative Example

First, experimental results comparing a change in the productivity between the plant factory 1 according to the embodiment of the invention and the conventional plant factory are shown in Table 1 below.

TABLE 1

| | Item/Building structure | |
| --- | --- | --- |
| | Conventional plant factory | Plant factory of the present invention |
| Cultivation floor area (m²) | 330 | 330 |
| The number of pots | 17,325 | 45,731 |
| Input resource (million won) | 400 | 760 |
| Utilization The number of | 43.3 (ea./million | 60.2 (ea./million |

TABLE 1-continued

| | | Item/Building structure | |
|---|---|---|---|
| | | Conventional plant factory | Plant factory of the present invention |
| efficiency | pots/Input resource | won) | won) |
| | Input resource/ Cultivation area | 0.404 (million won/m$^2$) | 0.287 (million won/m$^2$) |

As shown in Table 1, when the cultivation floor area is the same, comparing the number of cultivation ports compared to the input resources between the conventional plant factory and the plant factory 1 having the two-layered structure of the present embodiment, it can be seen that the construction costs may be reduced by the plant factory according to the embodiment of the present invention since it is advantageous in terms of the feasibility of the business, when calculating as the input resources per cultivation area (plant factory construction costs).

In addition, experimental results comparing a change in the airflow between the plant factory 1 according to the embodiment of the invention and the conventional plant factory are shown in Table 2 below.

TABLE 2

| | Item/Plant factory | |
|---|---|---|
| | Conventional plant factory | Plant factory of the present invention |
| Flow type of main airflow | Horizontal | Horizontal + Vertical |
| Airflow rate (horizontal/ vertical), m/s | 0.5/0.2 | 0.7/0.6 |
| Temperature deviation (upper layer temperature − lower layer temperature) | 2.5 (23 − 20.5) | 1.5 (23 − 21.5) |

Table 2 shows horizontal and vertical movement aspects of the airflow and airflow rate measurements. In the case of the plant factory 1 according to the embodiment of the present invention, in addition to the horizontal air flow through the cultivation chamber air circulation supply unit 50, a vertical air flow is induced through the interlayer air circulation unit 60 and the cultivation table air supply unit 70 as compared to the conventional plant factory. Therefore, it can be seen that the air flow rate (vertical/horizontal) inside the cultivation chamber can be increased and a vertical temperature deviation between the upper and lower cultivation layers 6 and 7 can be reduced, thereby it is possible to smoothly maintain the plant cultivation environment inside the cultivation chamber 5.

Further, experimental results comparing changes in the amount of light and electricity consumption between the plant factory 1 according to the embodiment of the invention and the conventional plant factory are shown in Table 3 below.

TABLE 3

| | Item/Plant factory | |
|---|---|---|
| | Conventional plant factory (fixed) | Plant factory of the present invention (adjustable) |
| Photosynthetic effective radiant flux density (PARD), Wm$^{-2}$ | 175 | 236 |
| Electricity consumption | 5.28 | 3.14 |

As shown in Table 3, in the case of the plant factory 1 according to one embodiment of the present invention, the LED lighting devices 81 forming the artificial light irradiation unit 80 are fixed inside the planting layers 25 of each cultivation table 20 in a height adjustable manner through the height adjustment means 100, and an angle of intensively irradiating the plants 200 planted in the planting beds 30 with the light emitted from the LED elements 82 is limited by the reflection plate 84. Accordingly, it can be seen that the photosynthetic effective radiant flux density may be more increased, and the electricity consumption used for this may be more reduced than the conventional plant factory.

Furthermore, experimental results comparing changes in the net photosynthetic rate (NPR)/carbon dioxide consumption rate utilization efficiency between the plant factory 1 according to the embodiment of the invention and the conventional plant factory are shown in Table 4 below.

TABLE 4

| | Item/Plant factory | |
|---|---|---|
| | Conventional plant factory | Plant factory of the present invention |
| $CO_2$ exchange rate {Q * ($CO_2$ in − $CO_2$ out)}, cc/min | −520 | −918 |

As shown in Table 4, it can be seen that, in the case of the plant factory 1 according to the embodiment of the present invention, in addition to supplying the carbon dioxide gas through the gas supply passage 93 and the gas spray holes 94 formed in the heat dissipation plate 83 of the LED lighting device 81 using the carbon dioxide gas supply unit 90, the carbon dioxide gas is supplied to the plants through the above-described cultivation table air supply unit 70, such that the exchange rate of carbon dioxide ($CO_2$) is higher than the conventional plant factory.

Therefore, as compared to the conventional plant factory, the plant factory 1 of the embodiment of the present invention may reduce the deviations in the temperature and carbon dioxide ($CO_2$) concentration by evenly improving the airflow rate regardless of the place in the cultivation chamber, and may improve the productivity by increasing the net photosynthetic rate and the growth rate of the plants.

While the present invention has been described with reference to the preferred embodiments and modified examples, the present invention is not limited to the above-described specific embodiments and the modified examples, and it will be understood by those skilled in the related art that various modifications and deviations may be made therein without departing from the scope of the present invention as defined by the appended claims, as well as these modifications and deviations should not be understood separately from the technical spirit and prospect of the present invention.

DESCRIPTION OF REFERENCE NUMERALS

1: Plant factory, 2: Building structure
5: Cultivation chamber, 6: Lower cultivation layer
7: Upper cultivation layer, 10: Layer division support frame
15: Mesh-shaped floor, 20: Cultivation table
21: Cultivation table frame, 22: Vertical cultivation table frame
22a: Vertical guide groove, 23: Horizontal cultivation table frame
25: Planting layer, 26: Transfer rail
27: Pipe-shaped wheel, 30: Planting bed
40: Nutrient solution circulation supply unit, 41: Nutrient solution tank
42: Nutrient solution supply pipe, 43: Nutrient solution circulation pump
44: Vertical nutrient solution supply pipe, 45: Vertical nutrient solution return pipe
46: Nutrient solution collect trench, 47: Nutrient solution return pipe
48: Nutrient solution regulator, 50: Cultivation chamber air circulation supply unit
51: Thermo-hygrostat, 52: Cultivation chamber air supply pipe
53: Air supply tube, 53a: Blade
54: Air discharge tube, 55: Cultivation chamber air return pipe
60: Interlayer air circulation unit, 61: Interlayer air circulation fan
70: Cultivation table air supply unit, 71: Cultivation table air supply pipe
72: In-line blowing fan, 73: Vertical air supply pipe
74: Horizontal air spray pipe, 75: Air spray hole
80: Artificial light irradiation unit, 81: LED lighting device
82: LED element, 83: Heat dissipation plate
84: Reflection plate, 90: Carbon dioxide gas supply unit
91: Gas storage tank, 92: Gas supply pipe
93: Gas supply passage, 94: Gas spray hole
100: Height adjustment means, 101: Height adjuster
101a: Adjuster body, 101b: Fixing screw
102: Support, 103: Support fastener
103a: Lighting fastener, 103b: Vertical air spray pipe fastener
200: Plant

The invention claimed is:

1. A plant factory comprising:
a layer division support frame which is configured to divide an inside of a cultivation chamber into a plurality of cultivation layers, and includes a mesh-shaped floor formed between the divided cultivation layers to allow air to flow therebetween;
a plurality of cultivation tables installed apart from each other in each cultivation layer divided by the layer division support frame;
a plurality of planting beds installed to divide one or more planting layers in each cultivation table, on which plants are planted;
a nutrient solution circulation supply unit configured to connect the planting beds with each other, and circulate and supply a nutrient solution required for plant growth;
a cultivation chamber air circulation supply unit configured to generate a horizontal airflow in each cultivation layer inside the cultivation chamber, and circulate and supply air therein;
an interlayer air circulation unit configured to generate an interlayer circulation airflow between the cultivation layers divided by the mesh-shaped floor of the layer division support frame;
a cultivation table air supply unit configured to connect upper portions of the planting layers of each cultivation table and supply air so as to create a vertical downdraft inside the planting layers;
an artificial light irradiation unit configured to irradiate the plants planted in the planting bed with a predetermined amount of light through an artificial light source provided on an upper side of the planting layers of each cultivation table; and
a carbon dioxide gas supply unit which extends to the upper side of the planting layers of each cultivation table, and is configured to supply a carbon dioxide gas close to the plants.

2. The plant factory according to claim 1, wherein each cultivation table has a mobile rack structure which is horizontally movable along transfer rails formed on a bottom of each cultivation layer.

3. The plant factory according to claim 1, wherein the cultivation chamber air circulation supply unit comprises:
a thermo-hygrostat configured to control a temperature and a humidity of the air circulated and supplied into the cultivation chamber,
a cultivation chamber air supply pipe configured to supply air supplied from the thermo-hygrostat through air supply tubes formed corresponding to the respective cultivation layers on one side of the cultivation chamber while generating a horizontal airflow in each cultivation layer; and
cultivation chamber air return pipes configured to allow the air supplied into the cultivation chamber to be returned to the thermo-hygrostat through air discharge tubes formed on the other side of the cultivation chamber corresponding to the respective cultivation layers.

4. The plant factory according to claim 3, wherein the air supply tube has a plurality of blades rotatably installed at an air supply end thereof to adjust an air supply amount and an air supply direction to be supplied into the cultivation chamber.

5. The plant factory according to claim 3, wherein the interlayer air circulation unit comprises a plurality of interlayer air circulation fans installed on a lower portion of the mesh-shaped floor forming a ceiling of each cultivation layer at a predetermined interval between the layer division support frames.

6. The plant factory according to claim 5, wherein the interlayer air circulation fans are installed so as to alternately generate up and down air circulations in one direction of each cultivation chamber, which are different circulation directions from each other.

7. The plant factory according to claim 3, wherein the cultivation table air supply unit comprises:
a cultivation table air supply pipe which is branched from the thermo-hygrostat and extends corresponding to the respective cultivation tables of each cultivation layer;
an in-line blowing fan provided on the cultivation table air supply pipe to pump and supply air branched and supplied from the thermo-hygrostat;
vertical air supply pipes connected to an extending end portion of the cultivation table air supply pipe, and vertically disposed along at least one side of each cultivation table; and horizontal air spray pipes which are branched from the vertical air supply pipe corresponding to the respective planting layers of the cultivation table, thus to be horizontally disposed on the upper side of the planting layers, and include air spray holes formed therein at a predetermined interval in a longitudinal direction thereof so as to generate vertical downward airflows.

8. The plant factory according to claim 7, wherein the artificial light irradiation unit includes LED lighting devices installed on each planting layer of each cultivation table in a plurality of columns in a longitudinal direction thereof.

9. The plant factory according to claim 8, wherein the LED lighting device comprises:
   a heat dissipation plate installed on the upper side of each planting layer of the cultivation table in the longitudinal direction thereof; and
   LED elements installed in a central portion of a lower surface of the heat dissipation plate,
   wherein the heat dissipation plate includes,
   reflection plates which are formed at opposite ends of a lower surface thereof by vertically extending from the lower surface to limit an angle of irradiating the plants planted in the planting bed with a light emitted from the LED elements.

10. The plant factory according to claim 9, wherein the reflection plate extends so that the light emitted from the LED element is irradiated with an irradiation angle range within a range of 110° to 130°.

11. The plant factory according to claim 9, wherein the heat dissipation plate further comprises:
   at least one gas supply passage formed therein in a longitudinal direction thereof; and
   a plurality of gas spray holes formed therein to penetrate toward the plants planted in the planting beds on the gas supply passage at a predetermined interval along one side of the LED element.

12. The plant factory according to claim 11, wherein the carbon dioxide gas supply unit comprises:
   a gas storage tank configured to store the carbon dioxide gas; and
   a gas supply pipe connected from the gas storage tank to the gas supply passages formed in the heat dissipation plates of the LED lighting device.

13. The plant factory according to claim 12, wherein the carbon dioxide gas supply unit further comprises a gas additional connection pipe which is branched from the gas supply pipe and is connected to the cultivation table air supply pipe, such that the carbon dioxide gas is optionally supplied into the planting layers of the cultivation table through the vertical air supply pipe and the horizontal air spray pipe.

14. The plant factory according to claim 12, further comprising a height adjustment means configured to adjust spaced heights of the vertical air supply pipe, the horizontal air spray pipe, and the LED lighting device from the plants planted in each planting layer of the cultivation table.

15. The plant factory according to claim 14, wherein the height adjustment means comprises:
   vertical height adjusters including adjuster bodies which are movably inserted into vertical guide grooves formed in a vertical frame of the cultivation table, and fixing screws configured to tighten the adjuster bodies to fix a vertical height thereof;
   at least one support whose opposite ends are tightened and fixed to the cultivation table so as to be installed in a transverse direction thereof in a state in which a height thereof is adjusted by the vertical height adjusters; and
   a support fastener serves to bind the horizontal air spray pipe and the LED lighting device to the support, and then hang them on the upper portion of the planting layer of the cultivation table to be fixed.

16. The plant factory according to claim 1, wherein the nutrient solution circulation supply unit comprises:
   a nutrient solution tank configured to store a nutrient solution;
   a nutrient solution supply pipe configured to connect the nutrient solution tank and one side of each of the planting beds of the respective cultivation tables;
   a vertical nutrient solution supply pipe which is installed on one side of the planting beds to connect one ends of the planting beds to each other, and is vertically disposed so as to supply the nutrient solution supplied from the nutrient solution supply pipe to the planting beds of each cultivation table;
   a nutrient solution circulation pump provided on the nutrient solution supply pipe to supply the nutrient solution into the planting beds forming the planting layers of each cultivation table;
   a vertical nutrient solution return pipe which is installed on the other side of the planting beds to connect the other ends of the planting beds to each other, and is configured to discharge the nutrient solution supplied to the planting bed to nutrient solution collect trenches formed in the respective cultivation layers;
   a nutrient solution return pipe which connects the nutrient solution collect trenches of each layer and the nutrient solution tank, and allows the nutrient solution collected in the nutrient solution collect trenches to be returned to the nutrient solution tank; and
   a nutrient solution regulator connected to the nutrient solution tank to adjust a concentration, acidity, temperature and oxygen concentration of the returned nutrient solution.

\* \* \* \* \*